United States Patent
Zhang et al.

(10) Patent No.: US 12,515,956 B2
(45) Date of Patent: *Jan. 6, 2026

(54) METHODS FOR PREPARING NANO-ORDERED CARBON ANODE MATERIALS FOR LITHIUM-ION BATTERIES

(71) Applicant: PHILLIPS 66 COMPANY, Houston, TX (US)

(72) Inventors: Liang Zhang, Owasso, OK (US); Brian J. Worfolk, Raleigh, NC (US)

(73) Assignee: Phillips 66 Company, Houston, TX (US)

( * ) Notice: Subject to any disclaimer, the term of this patent is extended or adjusted under 35 U.S.C. 154(b) by 789 days.

This patent is subject to a terminal disclaimer.

(21) Appl. No.: 17/873,452

(22) Filed: Jul. 26, 2022

(65) Prior Publication Data

US 2023/0051820 A1 Feb. 16, 2023

Related U.S. Application Data

(60) Provisional application No. 63/304,811, filed on Jan. 31, 2022, provisional application No. 63/304,914, (Continued)

(51) Int. Cl.
*C01B 32/05* (2017.01)
*C10G 29/22* (2006.01)
(Continued)

(52) U.S. Cl.
CPC .............. *C01B 32/05* (2017.08); *C10G 29/22* (2013.01); *C10G 29/28* (2013.01); *H01M 4/587* (2013.01);
(Continued)

(58) Field of Classification Search
CPC ....... C10G 29/22; C10G 29/28; H01M 4/587; H01M 2004/027; H01M 4/133;
(Continued)

(56) References Cited

U.S. PATENT DOCUMENTS

| | | |
|---|---|---|
| 2003/0143151 A1 | 7/2003 | Diener et al. |
| 2006/0216222 A1* | 9/2006 | Jang ................. B82Y 30/00 423/448 |

(Continued)

FOREIGN PATENT DOCUMENTS

| | | |
|---|---|---|
| CN | 108996492 | 10/2020 |
| EP | 1739771 | 8/2013 |
| EP | 3358656 | 12/2019 |

OTHER PUBLICATIONS

PCT Notification of Transmittal of the International Search Report and the Written Opinion of the International Searching Authority, or the Declaration, International Application No. PCT/US2022/038358, International Filing Date Jul. 26, 2022, 42 pages.

*Primary Examiner* — Anthony J Zimmer
*Assistant Examiner* — Jaanzeb C Raja
(74) *Attorney, Agent, or Firm* — Phillips 66 Company

(57) ABSTRACT

Embodiments of the present disclosure generally relate to methods for preparing carbon materials which can be used in battery electrodes. More specifically, embodiments relate to methods for preparing nano-ordered carbon products used as anode materials in metal-ion batteries, such as a lithium-ion battery. In one or more embodiments, a method includes exposing a liquid refinery hydrocarbon product to a first functionalization agent to produce a first solid functionalized product during a first functionalization process and exposing the first solid functionalized product to a second functionalization agent to produce a second solid functionalized product during a second functionalization process. Each of the first and second functionalization agents independently
(Continued)

contains an element selected from oxygen, sulfur, phosphorous, nitrogen, or any combination thereof. The method also includes carbonizing the second solid functionalized product at a temperature of about 1,000° C. to about 1,400° C. to produce a solid nano-ordered carbon product during a carbonization process.

20 Claims, 12 Drawing Sheets

Related U.S. Application Data filed on Jan. 31, 2022, provisional application No. 63/230,868, filed on Aug. 9, 2021.

(51) Int. Cl.
*C10G 29/28* (2006.01)
*H01M 4/02* (2006.01)
*H01M 4/587* (2010.01)

(52) U.S. Cl.
CPC ...... *C01P 2002/72* (2013.01); *C01P 2002/78* (2013.01); *C01P 2006/40* (2013.01); *H01M 2004/027* (2013.01)

(58) Field of Classification Search
CPC ............... H01M 4/1393; H01M 10/052; C01P 2002/72; C01P 2002/78; C01P 2006/40; C01B 32/15; Y02E 60/10
See application file for complete search history.

(56) References Cited

U.S. PATENT DOCUMENTS

2019/0077668 A1    3/2019   Zhamu et al.
2022/0010462 A1    1/2022   Atkins et al.

\* cited by examiner

METHODS FOR PREPARING NANO-ORDERED CARBON ANODE MATERIALS FOR LITHIUM-ION BATTERIES

CROSS-REFERENCE TO RELATED APPLICATIONS

This application is a Non-Provisional Patent Application which claims the benefit of and priority to U.S. Provisional Patent Application Ser. No. 63/230,868 filed Aug. 9, 2021, entitled "Multi Functionalization of Petroleum Products", U.S. Provisional Application Ser. No. 63/304,811 filed Jan. 31, 2022, entitled "Methods for Preparing Nano-Ordered Carbon Products from Petroleum Streams" and U.S. Provisional Application Ser. No. 63/304,914 filed Jan. 31, 2022, entitled "Methods for Preparing Nano-Ordered Carbon Anode Materials for Lithium-Ion Batteries" all of which are hereby incorporated by reference in their entirety.

BACKGROUND

Field

Embodiments of the present disclosure generally relate to battery technology, and more specifically, methods for preparing carbon-based materials used in battery technology.

Description of the Related Art

Lithium-ion battery technology has enjoyed a lot of attention in the past over 20 years and has been the preferred battery technology for most portable electronic devices in use today. Recently, Li-ion secondary batteries with high energy density and excellent output characteristics are being mounted in electric vehicles in response to increasing concern over environmental issues. A typical Li-ion battery contains an anode (negative electrode), a cathode (positive electrode), and a non-aqueous electrolyte material. When the battery is charging, the metal ions de-intercalate from the cathode and insert into the anode. Meanwhile charge balancing electrons pass from the cathode through the external circuit containing the charger and into the anode of the battery. During discharge the same process occurs but in the opposite direction.

Graphite is currently the most common anode materials in Li-ion batteries due to its preferred lithiation and delithiation profiles. However, the relatively lower theoretical capacity (372 mAh/g) of graphite is throttling the constant demand in the industry of increasing battery energy density. In addition, the market desire for fast charge and low temperature performance is also directing R&D effort toward other anode material options. Carbon materials with nano-ordered structures, such as non-graphizable carbon (or hard carbon), attracted material developers due to its potentially larger capacity (>372 mAh/g) and better performance in power and low temperature applications.

Hard carbon has been conventionally derived from biomass feedstocks that contain significant amounts of oxygen. These feedstocks are difficult to collect due to localized nature, difficult to process due to large amount of impurities, and challenging to control quality which leads to inconsistent product. In addition, the yield from these feedstocks are known to be low, such as about 10%-20%.

Heavy refinery hydrocarbon streams, such as petroleum streams, are ideal as natural building blocks for value-added carbonaceous materials in batteries. Traditional approaches to making hard carbon products from petroleum-based feedstock usually are carried out via a lengthy process. For example, a hard carbon material can be made from a petroleum pitch by mixing the pitch with an additive in a heated molten state followed by extruding into pellets, emulsification into micro-sized particles, removing additives by solvent washing, air oxidation in fluidized bed reactor, and calcining in high temperature furnace.

Therefore, there is a need for improved methods to prepare nano-ordered carbon materials capable of having higher specific capacity and desired structural parameters, and where the methods are faster, more efficient, and produce greater yields than traditional methods for preparing similar carbon materials.

SUMMARY

Embodiments of the present disclosure generally relate to methods for preparing carbon materials which can be used in battery electrodes. More specifically, embodiments relate to methods for preparing solid nano-ordered carbon (NOC) products from hydrocarbon streams which are functionalized by processes described and discussed herein. The solid nano-ordered carbon products can be used as anode materials in metal-ion batteries, such as a lithium-ion battery.

In one or more embodiments, a method for preparing a nano-ordered carbon is provided and includes exposing a liquid refinery hydrocarbon product, such as a petroleum product, to a first functionalization agent to produce a first solid functionalized product during a first functionalization process. The first functionalization agent contains at least one element selected from oxygen, sulfur, phosphorous, nitrogen, or any combination thereof. The method further includes exposing the first solid functionalized product to a second functionalization agent to produce a second solid functionalized product during a second functionalization process. The second functionalization agent contains at least one element selected from oxygen, sulfur, phosphorous, nitrogen, or any combination thereof. The method also includes carbonizing the second solid functionalized product at a temperature of about 1,000° C. to about 1,400° C. to produce a solid nano-ordered carbon product during a carbonization process.

In other embodiments, a method for preparing a nano-ordered carbon is provided and includes exposing a liquid refinery hydrocarbon product to a first oxidizing agent to produce a first solid functionalized product during a first oxidation process, wherein the first solid functionalized product contains about 1 wt % to less than 15 wt % of oxygen and purifying the first solid functionalized product during a purification process. The method also includes exposing the first solid functionalized product to a second oxidizing agent to produce a second solid functionalized product during a second oxidation process, wherein the second solid functionalized product contains 15 wt % to about 50 wt % of oxygen and carbonizing the second solid functionalized product at a temperature of about 1,000° C. to about 1,400° C. to produce a solid nano-ordered carbon product during a carbonization process.

In some embodiments, a method for preparing a nano-ordered carbon is provided and includes exposing a liquid refinery hydrocarbon product to a first oxidizing agent to produce a first solid functionalized product during a first oxidation process. The liquid refinery hydrocarbon product has a boiling point of about 260° C. to about 704° C., an average molecular weight of about 100 to about 400, and an average number of aromatic rings of 2 to about 10. The first solid functionalized product contains about 1 wt % to less than 15 wt % of oxygen and has an average molecular weight of about 400 to about 1,500. The method also includes purifying the first solid functionalized product during a purification process and exposing the first solid functionalized product to a second oxidizing agent to produce a second solid functionalized product during a second oxidation process. The second solid functionalized product contains 15 wt % to about 30 wt % of oxygen. The method further includes carbonizing the second solid functionalized product at a temperature of about 1,050° C. to about 1,250° C. to produce a solid nano-ordered carbon product during a carbonization process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawing. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the Figures. It is contemplated that elements and features of one or more embodiments may be beneficially incorporated in other embodiments.

DETAILED DESCRIPTION

Figure 1:
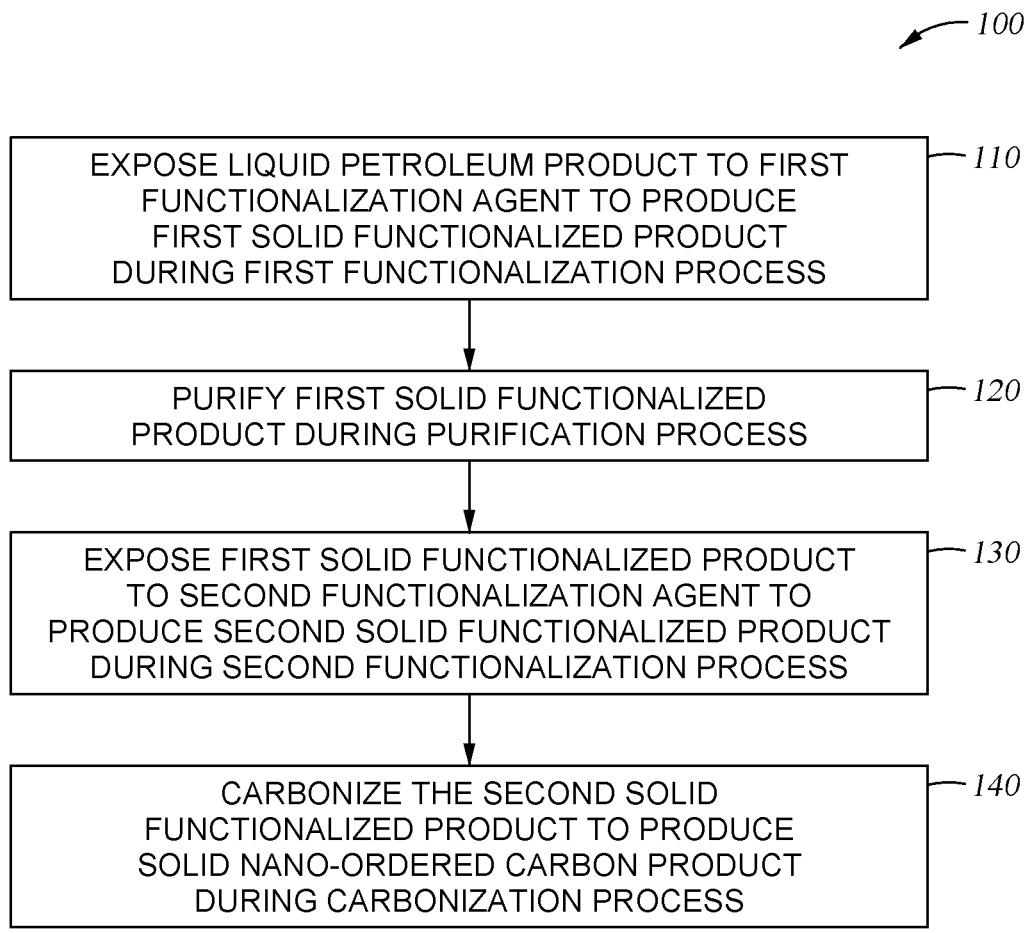
FIG. 1 is a flowchart illustrating a method for preparing solid nano-ordered carbon products, according to one or more embodiments described and discussed herein.

Embodiments of the present disclosure generally relate to methods for preparing carbon materials which can be used in battery electrodes. More specifically, embodiments relate to methods for preparing solid nano-ordered carbon products from hydrocarbon streams which are functionalized by processes described and discussed herein. The solid nano-ordered carbon products can be used as anode materials in metal-ion batteries, such as a lithium-ion battery.

A method for preparing a nano-ordered carbon, comprising: exposing a liquid refinery hydrocarbon product to a first functionalization agent to produce a first solid functionalized product during a first functionalization process, wherein the first functionalization agent comprises at least one element selected from oxygen, sulfur, phosphorous, nitrogen, or any combination thereof. The method exposes the first solid functionalized product to a second functionalization agent to produce a second solid functionalized product during a second functionalization process, wherein the second functionalization agent comprises at least one element selected from oxygen, sulfur, phosphorous, nitrogen, or any combination thereof. The method can also carbonize the second solid functionalized product at a temperature of about 1,000° C. to about 1,400° C. to produce a solid nano-ordered carbon product during a carbonization process.

In one embodiment, the second solid functionalized product is heated to a temperature of about 1,050° C. to about 1,250° C. during the carbonization process. In an alternate embodiment, the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof.

In one method, the liquid refinery hydrocarbon product has a boiling point of about 260° C. to about 704° C., an average molecular weight of about 100 to about 400, and an average number of aromatic rings of 2 to about 10. In yet another method, the first functionalization process comprises an air oxidation process, an acid treatment process, a sulfurization process, a peroxide oxidation process, an organic compound oxidation process, a crosslinking process, or any combination thereof.

In one method, the first functionalization agent is selected from oxygen gas ($O_2$), air, oxygen-enriched air, sulfuric acid, nitric acid, hydrogen peroxide, or any combination thereof. Yet in another embodiment, the first solid functionalized product comprises about 1 wt % to less than 15 wt % of oxygen.

It is possible in one embodiment, that the first solid functionalized product has an average molecular weight of about 400 to about 1,500. In one embodiment, purifying the first solid functionalized product during a purification process after the first functionalization process and prior to the second functionalization process. It is possible in one embodiment, the first solid functionalized product is ground into particles having an average particle size of less than 250 μm prior to the purification process or the second functionalization process.

In yet another embodiment, the first solid functionalized product is exposed to a solvent extraction during the purification process. In another embodiment, a contaminant is separated from the first solid functionalized product during the purification process, and wherein the contaminant comprises an aromatic or polyaromatic compound with one or more long side chains, a paraffinic compound, or a combination thereof.

In one embodiment, the second functionalization process comprises an air oxidation process, an acid treatment process, a sulfurization process, a peroxide oxidation process, an organic compound oxidation process, a crosslinking process, or any combination thereof. In yet another embodiment, the second functionalization agent is selected from oxygen gas ($O_2$), air, oxygen-enriched air, sulfuric acid, nitric acid, hydrogen peroxide, or combinations thereof.

It is also possible in one embodiment that the second solid functionalized product comprises 15 wt % to about 50 wt % of oxygen. In yet another embodiment, the solid nano-ordered carbon product has interspacing of about 3.4 Å to about 3.9 Å.

In one method, a method for preparing a nano-ordered carbon, is taught where exposing a liquid refinery hydrocarbon product to a first oxidizing agent to produce a first solid functionalized product during a first oxidation process, wherein the first solid functionalized product comprises about 1 wt % to less than 15 wt % of oxygen. The method can purify the first solid functionalized product during a purification process. In yet another embodiment, exposing the first solid functionalized product to a second oxidizing agent to produce a second solid functionalized product during a second oxidation process, wherein the second solid functionalized product comprises 15 wt % to about 50 wt % of oxygen. Carbonizing can occur to the second solid functionalized product at a temperature of about 1,000° C. to about 1,400° C. to produce a solid nano-ordered carbon product during a carbonization process.

In one embodiment, the second solid functionalized product is heated to a temperature of about 1,050° C. to about 1,250° C. during the carbonization process. In yet another embodiment, the solid nano-ordered carbon product has interspacing of about 3.4 Å to about 3.9 Å. In yet another embodiment, a contaminant is separated from the first solid functionalized product during the purification process, and wherein the contaminant comprises an aromatic or polyaromatic compound with one or more long side chains, a paraffinic compound, or a combination thereof.

A method can also be taught for preparing a nano-ordered carbon where exposing a liquid refinery hydrocarbon product to a first oxidizing agent to produce a first solid functionalized product during a first oxidation process, wherein the liquid refinery hydrocarbon product has a boiling point of about 260° C. to about 704° C., an average molecular weight of about 100 to about 400, and an average number of aromatic rings of 2 to about 10, and wherein the first solid functionalized product comprises about 1 wt % to less than 15 wt % of oxygen and has an average molecular weight of about 400 to about 1,500. In this method purifying the first solid functionalized product during a purification process. The method can also expose the first solid functionalized product to a second oxidizing agent to produce a second solid functionalized product during a second oxidation process, wherein the second solid functionalized product comprises 15 wt % to about 30 wt % of oxygen. The carbonizing can also occur to the second solid functionalized product at a temperature of about 1,050° C. to about 1,250° C. to produce a solid nano-ordered carbon product during a carbonization process.

The method broadly includes producing the solid nano-ordered carbon products from the hydrocarbon stream via a first functionalization process, a purification process, a second functionalization process, and a carbonization process.

In one or more embodiments, it has been surprisingly and unexpectedly shown that the solid nano-ordered carbon product heated and carbonized at a temperature within a predetermined narrow range (e.g., about 1,000° C. to about 1,400° C. and narrower ranges) during the carbonization process has advantageous properties as an anode material within lithium-ion batteries. The solid nano-ordered carbon products produced by the methods described and discussed herein have relatively high storage capacities (e.g., about 400 mAh/g to about 550 mAh/g or greater) and high first cycle efficiency (FCE) values (e.g., about 58% to about 80%) when used as an anode material within lithium-ion batteries.

FIG. 1 is a flowchart illustrating a method 100 containing operations 110-140 for preparing solid nano-ordered carbon products, according to one or more embodiments described and discussed herein. At operation 110, a liquid refinery hydrocarbon product is exposed to or otherwise combined with one or more first functionalization agents to produce the first solid functionalized product during a first functionalization process. At operation 120, the first solid functionalized product is purified during a purification process. At operation 130, the first solid functionalized product is exposed to or otherwise combined with one or more second functionalization agents to produce a second solid functionalized product during a second functionalization process. At operation 140, the second solid functionalized product is heated and carbonized to produce a solid nano-ordered carbon product during a carbonization process.

In one or more embodiments, prior to the first functionalization process at operation 110, an initial refinery hydrocarbon product can be exposed to or otherwise treated to one or more pretreatments, such as a heat soaking process to produce the liquid refinery hydrocarbon product. In one or more examples, the initial refinery hydrocarbon product is heated to a temperature of about 200° C. to about 600° C. for about 1 hour to about 24 hours during the heat soaking process. In other examples, the initial refinery hydrocarbon product is heated to a temperature of about 300° C. to about 450° C. for about 2 hours to about 12 hours during the heat soaking process. The initial refinery hydrocarbon product can be maintained under a vacuum or an inert atmosphere containing nitrogen ($N_2$), argon, helium, or combinations thereof during the heat soaking process. In some examples, the heat soak is able to produce the liquid refinery hydrocarbon product with an average molecular weight of greater than 400 and an average number of aromatic rings greater than 10. In another embodiment, the liquid refinery hydrocarbon product has an average molecular weight of greater than 500.

In some embodiments, the initial refinery hydrocarbon product can be pretreated by distillation to remove light fraction (e.g., fractions with boiling point ranges of less than 482° C. (900° F.) or less than 260° C. (500° F.)) and produce the liquid refinery hydrocarbon product. In another embodiment, the initial refinery hydrocarbon product can be pretreated by filtration and/or adding chemical agent to remove catalyst fine particles that are entrained during FCC operation in order to produce the liquid refinery hydrocarbon product. The initial refinery hydrocarbon product can be further hydrotreated to remove sulfur and/or nitrogen while producing the liquid refinery hydrocarbon product.

At operation 110, the liquid refinery hydrocarbon product is exposed to or otherwise combined with one or more first functionalization agents during the first functionalization process to produce the first solid functionalized product. The liquid refinery hydrocarbon product can be or include any type of hydrocarbon which can be functionalized (e.g., oxidized or sulfurized) to form the functionalized solid product. The liquid refinery hydrocarbon product can be selected from the liquid components that are produced from a fluid catalytic cracking (FCC) unit, a coking reactor, ethylene cracking, coal coking, or even a distillation tower. The liquid refinery hydrocarbon product can be or include one or more FCC slurry oils, one or more heavy hydrocarbon streams containing polyaromatic hydrocarbons, one or more coker gas oils from a coking process, one or more vacuum or distillation gas oils from vacuum distillation, one or more ethylene tars, one or more cracking fluids, one or more coal tars, or any combination thereof. Typically, an FCC unit is used to convert high-boiling point, high molecular weight hydrocarbons into other products, such as FCC slurry oils. In one or more examples, the liquid refinery hydrocarbon product containing an FCC slurry oil has a boiling point of about 260° C. (500° F.) to about 704° C. (1,300° F.), an average molecular weight of about 100 to about 400, and an average number of aromatic rings of 2 to about 10. In some examples, the liquid refinery hydrocarbon product contains about 20 wt % to about 99 wt % of aromatic or polyaromatic molecules. In one or more examples, about 20% to about 80% of the carbon atoms in the liquid refinery hydrocarbon product belong to aromatic carbon family, as detected by nuclear magnetic resonance (NMR) spectroscopy. The FCC slurry oil is generally defined as lower viscosity, catalytic-cracked clarified oil that generally has a viscosity of about 48 cST to about 200 cST @ 122° F. In other examples, the liquid refinery hydrocarbon product containing an FCC slurry oil has an average molecular weight of greater than 400 to about 600 and an average number of aromatic rings greater than 10 to about 20. The use of the liquid refinery hydrocarbon products allows for solid nano-ordered carbon products to be produced on a mass scale, from a centralized and extremely low-cost feedstock.

The first functionalization agent contains at least one element selected from oxygen, sulfur, phosphorous, nitrogen, or any combination thereof. It is theorized that the crosslinking of these functional groups will increase the softening point of the liquid refinery hydrocarbon product to at least 100° C., 120° C., 150° C., even greater than 300° C. In one or more embodiments, the first functionalization process can be or include an air oxidation process, an acid treatment process, a sulfurization process, a peroxide oxidation process, an organic compound oxidation process, a crosslinking process, or any combination thereof. In some examples, the first functionalization agent is selected from oxygen gas ($O_2$), air, oxygen-enriched air, sulfuric acid, nitric acid, hydrogen peroxide, elemental sulfur ($S_8$), elemental phosphorus ($P_4$, such as white phosphorus or red phosphorus), one or more organic phosphines, or any combination thereof. Nitric acid, as the first functionalization agent, can be used as an oxidizing agent, a nitriding agent, or both.

In one or more embodiments, the liquid refinery hydrocarbon product is exposed to a first oxidizing agent as the first functionalization agent to produce the first solid functionalized product during a first oxidation process as the first functionalization process at operation 110. The first oxidizing agent can be or include oxygen gas, air, or oxygen-enriched air. One or more blowers or fans can be used to introduce the first oxidizing agent to the liquid refinery hydrocarbon product. The oxygen-enriched air can be a mixture containing air and supplemental oxygen gas so to provide the mixture with a greater oxygen concentration over ambient air.

In one or more examples, the liquid refinery hydrocarbon product can be catalyzed heat soaked with addition of small amount of oxidizing agents such as sulfuric acid, nitric acid, or hydrogen peroxide. In other examples, the first functionalization agent can be or include one or more oxygen-containing organic compounds which can be combined with the liquid refinery hydrocarbon product during an organic compound oxidation process. Exemplary oxygen-containing organic compounds can be or includes one or more organic peroxides, one or more organic acids, one or more anhydrides, one or more esters, one or more ketones, one or more aldehydes, or any combination thereof. In some examples, the first functionalization agent can be or include one or more crosslinkers, such as one or more vinyl monomers during a crosslinking process. Exemplary vinyl monomers can be or include divinylbenzene, diallyl phthalate (DAP), diallyl isophthalate (DAIP), or any combination thereof.

The reaction mixture containing the liquid refinery hydrocarbon product and the first functionalization agent is heated to a process temperature during the first functionalization process. The process temperature can be from a minimum value of about 50° C., about 100° C., about 150° C., about 200° C., about 250° C., or about 300° C. to a maximum value of about 350° C., about 400° C., about 500° C., about 600° C., about 700° C., about 800° C., about 900° C., about 950° C., about 990° C., or less than 1,000° C. during the first functionalization process. For example, the process temperature can be about 50° C. to less than 1,000° C., about 100° C. to less than 1,000° C., about 200° C. to less than 1,000° C., about 350° C. to less than 1,000° C., about 500° C. to less than 1,000° C., about 750° C. to less than 1,000° C., about 900° C. to less than 1,000° C., about 50° C. to about 900° C., about 100° C. to about 900° C., about 200° C. to about 900° C., about 350° C. to about 900° C., about 500° C. to about 900° C., about 750° C. to about 900° C., about 50° C. to about 700° C., about 100° C. to about 700° C., about 200° C. to about 700° C., about 350° C. to about 700° C., about 500° C. to about 700° C., about 600° C. to about 700° C., about 50° C. to about 500° C., about 100° C. to about 500° C., about 200° C. to about 500° C., about 250° C. to about 500° C., about 300° C. to about 500° C., or about 350° C. to about 500° C. during the first functionalization process.

In one or more examples, the initial functionalizing occurs via air oxidation at a temperature of about 200° C. to about 375° C. during the first functionalization process. In other examples, the air oxidation can occur at a temperature of about 325° C. to about 375° C., such as from about 340° C. to about 360° C. during the first functionalization process.

The reaction mixture containing the liquid refinery hydrocarbon product and the first functionalization agent is heated and/or maintained at the process temperature for a time period from a minimum value of about 0.1 hours, about 0.25 hours, about 0.5 hours, about 0.75 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the first functionalization process.

In one or more embodiments, the first solid functionalized product can be ground, milled, or otherwise reduced into micro-sized particles prior to going through the purification process. Micro-sized particles can generally have a particle size of about 1 μm to about 1,000 μm, about 10 μm to about 500 µm, about 100 µm to about 400 µm, or less than 250 µm. In one or more examples, the first solid functionalized product is ground into micro-sized particles having an average particle size of less than 250 µm prior to the purification process and/or the second functionalization process. In other examples, the first solid functionalized product is ground into micro-sized particles after the purification process and before the second functionalization process.

At operation 120, the first solid functionalized product is purified and/or filtered during the purification process. One of the benefits of restricting the initial functionalization to a maximum functional group weight percentage within the first solid functionalized product is that it allows for an opportunity to purify the first solid functionalized product of contaminants prior to a secondary functionalization of the first solid functionalized product. Exemplary contaminants can be or include unreacted components such as one or more aromatic or polyaromatic compounds with one or more long side chains, a paraffinic compound, or a combination thereof. It is theorized that removal of these contaminants has an adverse effect on the end product of the solid nano-ordered carbon.

In one or more examples, the first solid functionalized product is exposed to a solvent extraction during the purification process. The solvent can be or include any solvent or combination of solvents which the first solid functionalized product is relatively insoluble in so that the contaminants can be later readily removed or otherwise separated from the first solid functionalized product. The solvent can be or include xylene, toluene, benzene, pyridine, mesitylene, benzyl alcohol, benzonitrile, nitrobenzene, one or more alkanes, or any combination thereof. Exemplary alkanes can be or include butane, pentane, hexane, heptane, octane, nonane, decane, undecane, dodecane, isomers thereof, or any combination thereof.

In one or more examples, the first solid functionalized product is purified by solvent extraction with a non-polar solvent such as heptane to remove contaminants. In this example since the first solid functionalized product is purified by a non-polar solvent, adequate time and/or process can be allocated to ensure that the first solid functionalized product is dried prior to secondary functionalization.

The first solid functionalized product contains one or more functional groups selected from oxygen, sulfur, phosphorous, nitrogen, or any combination thereof. As such, the first solid functionalized product can be or include an oxidized product, a sulfurized product, a phosphorized product, a nitrided product, or any combination thereof. The first solid functionalized product has a concentration of the functional group from a minimum value of about 1 wt %, about 2 wt %, about 2.5 wt %, about 3 wt %, about 4 wt %, about 5 wt %, or about 6 wt % to a maximum value of about 7 wt %, about 8 wt %, about 9 wt %, about 10 wt %, about 11 wt %, about 12 wt %, about 13 wt %, about 14 wt %, about 14.8 wt %, or less than 15 wt %. For example, the first solid functionalized product contains about 1 wt % to less than 15 wt %, about 2 wt % to less than 15 wt %, about 3 wt % to less than 15 wt %, about 5 wt % to less than 15 wt %, about 6 wt % to less than 15 wt %, about 8 wt % to less than 15 wt %, about 10 wt % to less than 15 wt %, about 12 wt % to less than 15 wt %, about 1 wt % to about 12 wt %, about 2 wt % to about 12 wt %, about 3 wt % to about 12 wt %, about 5 wt % to about 12 wt %, about 6 wt % to about 12 wt %, about 8 wt % to about 12 wt %, about 10 wt % to about 12 wt %, about 1 wt % to about 10 wt %, about 2 wt % to about 10 wt %, about 3 wt % to about 10 wt %, about 5 wt % to about 10 wt %, about 6 wt % to about 10 wt %, about 8 wt % to about 10 wt %, about 1 wt % to about 7 wt %, about 2 wt % to about 7 wt %, about 3 wt % to about 7 wt %, or about 5 wt % to about 7 wt % of the functional group selected from oxygen, sulfur, phosphorous, nitrogen, or any combination thereof. In one or more examples, the first solid functionalized product contains about 1 wt % to less than 15 wt %, about 2 wt % to about 14 wt %, or about 3 wt % to about 10 wt % of oxygen.

As a result of the initial functionalization, the first solid functionalized product can have an average molecular weight increased from about 400 to about 1,500, about 500 to about 1,400, or about 600 to about 1,200. Also, in some embodiments, the initial functionalization provides the first solid functionalized product to have up to about 10 wt % or up to about 15 wt % of the functional group. For example, the first solid functionalized product to have about 2 wt % to about 10 wt % of the functional group.

At operation 130, the first solid functionalized product is exposed to or otherwise combined with one or more second functionalization agents to produce a second solid functionalized product during a second functionalization process. The second functionalization agent contains at least one element selected from oxygen, sulfur, phosphorous, nitrogen, or any combination thereof. In one or more examples, the first functionalization agent and the second functionalization agent have different compositions. Alternatively, in other examples, the first functionalization agent and the second functionalization agent have the same composition.

In some embodiments, the processes of performing the first functionalization process and the second functionalization process can be the same or different. In one or more embodiments, the second functionalization process can be or include an air oxidation process, an acid treatment process, a sulfurization process, a peroxide oxidation process, an organic compound oxidation process, a crosslinking process, or any combination thereof. In some examples, the second functionalization agent can be or include oxygen gas ($O_2$), air, oxygen-enriched air, sulfuric acid, nitric acid, hydrogen peroxide, elemental sulfur ($S_8$), elemental phosphorus ($P_4$, such as white phosphorus or red phosphorus), one or more organic phosphines, or any combination thereof. Nitric acid, as the second functionalization agent, can be used as an oxidizing agent, a nitriding agent, or both.

In one or more embodiments, the liquid refinery hydrocarbon product is exposed to a first oxidizing agent as the first functionalization agent to produce the first solid functionalized product during a first oxidation process as the first functionalization process at operation 130. The first oxidizing agent can be or include oxygen gas, air, or oxygen-enriched air. One or more blowers or fans can be used to introduce the first oxidizing agent to the liquid refinery hydrocarbon product. The oxygen-enriched air can be a mixture containing air and supplemental oxygen gas so to provide the mixture with a greater oxygen concentration over ambient air.

In one or more examples, the liquid refinery hydrocarbon product can be catalyzed heat soaked with addition of small amount of oxidizing agents such as sulfuric acid, nitric acid, or hydrogen peroxide. In other examples, the first functionalization agent can be or include one or more oxygen-containing organic compounds (e.g., organic peroxides, organic acids, anhydrides, esters, ketones, aldehydes, or combinations thereof) which can be combined with the liquid refinery hydrocarbon product during an organic compound oxidation process. In some examples, the first functionalization agent can be or include one or more crosslinkers, such as one or more vinyl monomers (e.g., divinylbenzene or diallyl phthalate) during a crosslinking process.

In one embodiment, the secondary functionalization can occur through air oxidation during the second functionalization process. For example, the secondary functionalization of the first solid functionalized product can be deeply oxidized with air in powder drying equipment. The oxidation temperature can range from about 250° C. to about 350° C. In some examples, this secondary functionalization can increase the oxygen content of the intermediate product from about 15 wt % to about 30 wt %. The second solid functionalized product promotes crosslinking which prevents the growth or long-range ordered carbon structure during carbonization and subsequently helps in the formation of the solid nano-ordered carbon product.

The reaction mixture containing the first solid functionalized product and the second functionalization agent is heated to a process temperature during the second functionalization process. The process temperature can be from a minimum value of about 50° C., about 100° C., about 150° C., about 200° C., about 250° C., or about 300° C. to a maximum value of about 350° C., about 400° C., about 500° C., about 600° C., about 700° C., about 800° C., about 900° C., about 950° C., about 990° C., or less than 1,000° C. during the second functionalization process. For example, the process temperature can be about 50° C. to less than 1,000° C., about 100° C. to less than 1,000° C., about 200° C. to less than 1,000° C., about 350° C. to less than 1,000° C., about 500° C. to less than 1,000° C., about 750° C. to less than 1,000° C., about 900° C. to less than 1,000° C., about 50° C. to about 900° C., about 100° C. to about 900° C., about 200° C. to about 900° C., about 350° C. to about 900° C., about 500° C. to about 900° C., about 750° C. to about 900° C., about 50° C. to about 700° C., about 100° C. to about 700° C., about 200° C. to about 700° C., about 350° C. to about 700° C., about 500° C. to about 700° C., about 600° C. to about 700° C., about 50° C. to about 500° C., about 100° C. to about 500° C., about 200° C. to about 500° C., about 250° C. to about 500° C., about 300° C. to about 500° C., or about 350° C. to about 500° C. during the second functionalization process.

In one or more examples, a reaction mixture containing the first solid functionalized product and the second functionalization agent is heated to a process temperature of about 200° C. to about 400° C. or about 250° C. to about 350° C. during the second functionalization process. In some examples, the secondary functionalizing occurs via air oxidation at a temperature of about 200° C. to about 375° C. during the second functionalization process. In other examples, the air oxidation can occur at a temperature of about 325° C. to about 375° C., such as from about 340° C. to about 360° C. during the second functionalization process.

The reaction mixture containing the first solid functionalized product and the second functionalization agent is heated and/or maintained at the process temperature for a time period from a minimum value of about 0.1 hours, about 0.25 hours, about 0.5 hours, about 0.75 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the second functionalization process.

The second solid functionalized product contains one or more functional groups selected from oxygen, sulfur, phosphorous, nitrogen, or any combination thereof. As such, the second solid functionalized product can be or include an oxidized product, a sulfurized product, a phosphorized product, a nitrided product, or any combination thereof. The second solid functionalized product has a concentration of the functional group from a minimum value of 15 wt %, about 16 wt %, about 18 wt %, about 20 wt %, about 22 wt %, about 24 wt %, or about 25 wt % to a maximum value of about 26 wt %, about 28 wt %, about 30 wt %, about 32 wt %, about 35 wt %, about 38 wt %, about 40 wt %, about 42 wt %, about 45 wt %, about 50 wt %, or greater. For example, the second solid functionalized product contains 15 wt % to about 50 wt %, 15 wt % to about 45 wt %, 15 wt % to about 40 wt %, 15 wt % to about 35 wt %, 15 wt % to about 30 wt %, 15 wt % to about 25 wt %, 15 wt % to about 22 wt %, 15 wt % to about 20 wt %, 15 wt % to about 18 wt %, about 18 wt % to about 50 wt %, about 18 wt % to about 45 wt %, about 18 wt % to about 40 wt %, about 18 wt % to about 35 wt %, about 18 wt % to about 30 wt %, about 18 wt % to about 25 wt %, about 18 wt % to about 22 wt %, about 18 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, or about 20 wt % to about 22 wt % of the functional group selected from oxygen, sulfur, phosphorous, nitrogen, or any combination thereof. In one or more examples, the second solid functionalized product contains 15 wt % to about 50 wt %, about 16 wt % to about 40 wt %, or about 18 wt % to about 30 wt % of oxygen.

At operation 140, the second solid functionalized product is further processed to produce one or more solid nano-ordered (NOC) carbon products during the carbonization process. For example, the second solid functionalized product can be heated and carbonized to produce the solid nano-ordered carbon product during the carbonization process. The second solid functionalized product can be heated and maintained under an atmosphere of a relatively inert gas (e.g., dinitrogen, argon, helium, or mixtures thereof) or can be maintained under a vacuum while producing the solid nano-ordered carbon product during the carbonization process. The solid nano-ordered carbon products can be or include hard carbon, as well as other types of carbon materials, such as soft carbon, glassy carbon, or porous carbon, or combination of these materials.

The carbonization process can be performed in a furnace (e.g., graphitization furnace or carbonization furnace), a thermal chamber, a reactor, or another type of vessel or container. In one or more embodiments, the second solid functionalized product is heated to a temperature of about 800° C. or greater for about 1 hour to about 5 hours during the carbonization process to produce the solid nano-ordered carbon product used as the anode carbon material. The second solid functionalized product is heated to a temperature from a minimum value of about 800° C., about 900° C., about 1,000° C., about 1,200° C., or about 1,400° C. to a maximum value of about 1,500° C., about 1,650° C., about 1,800° C., about 2,000° C., about 2,300° C., about 2,500° C., about 2,700° C., about 2,900° C., about 3,000° C., or greater during the carbonization process. For example, the second solid functionalized product is heated to a temperature of about 800° C. to about 3,000° C., about 800° C. to about 2,500° C., about 800° C. to about 2,000° C., about 800° C. to about 1,800° C., about 800° C. to about 1,500° C., about 800° C. to about 1,000° C., about 1,000° C. to about 3,000° C., about 1,000° C. to about 2,900° C., about 1,000° C. to about 2,500° C., about 1,000° C. to about 2,200° C., about 1,000° C. to about 2,000° C., about 1,000° C. to about 1,800° C., about 1,000° C. to about 1,500° C., about 1,000° C. to about 1,200° C., about 1,400° C. to about 3,000° C., about 1,400° C. to about 2,500° C., about 1,400° C. to about 2,000° C., or about 1,400° C. to about 1,800° C. during the carbonization process.

In one or more embodiments, when the second solid functionalized product is heated and carbonized at a temperature within a predetermined narrow range, it has been surprisingly and unexpectedly shown that the solid nano-ordered carbon products prepared during the carbonization process have advantageous properties as an anode material within lithium-ion batteries. These solid nano-ordered carbon products exhibit relatively high storage capacities as well as FCE values if carbonized at temperatures within the predetermined narrow range compared to temperatures outside of this range. Broadly, during the carbonization process, the second solid functionalized product is heated at a temperature of about 1,000° C. to about 1,400° C. to produce the solid nano-ordered carbon product with relatively high storage capacities (e.g., about 400 mAh/g to about 550 mAh/g or greater) and high FCE values (e.g., about 58% to about 80%) when used as an anode material within lithium-ion batteries.

In such embodiments, the second solid functionalized product is heated to a temperature from a minimum value of about 1,000° C., about 1,050° C., about 1,100° C., or about 1,150° C. to a maximum value of about 1,200° C., about 1,250° C., about 1,300° C., about 1,350° C., or about 1,400° C. during the carbonization process. For example, the second solid functionalized product is heated to a temperature of about 1,000° C. to about 1,400° C., about 1,000° C. to about 1,350° C., about 1,000° C. to about 1,300° C., about 1,000° C. to about 1,250° C., about 1,000° C. to about 1,200° C., about 1,050° C. to about 1,400° C., about 1,050° C. to about 1,350° C., about 1,050° C. to about 1,300° C., about 1,050° C. to about 1,250° C., about 1,050° C. to about 1,200° C., about 1,100° C. to about 1,400° C., about 1,100° C. to about 1,350° C., about 1,100° C. to about 1,300° C., about 1,100° C. to about 1,250° C., about 1,100° C. to about 1,200° C., about 1,150° C. to about 1,400° C., about 1,150° C. to about 1,350° C., about 1,150° C. to about 1,300° C., about 1,150° C. to about 1,250° C., or about 1,150° C. to about 1,200° C. during the carbonization process.

In one or more examples, the carbonization process includes heating the second solid functionalized product at a temperature of about 1,000° C. to about 1,400° C. for about 0.5 hours to about 10 hours to produce the solid nano-ordered carbon product. In other examples, the carbonization process includes heating the second solid functionalized product at a temperature of about 1,050° C. to about 1,250° C. for about 1 hour to about 5 hours to produce the solid nano-ordered carbon product. In some examples, the carbonization process includes heating the second solid functionalized product at a temperature of about 1,100° C. to about 1,200° C. for about 2 hours to about 4 hours to produce the solid nano-ordered carbon product.

The carbonization process can produce the solid nano-ordered carbon product with interspacing of about 3.4 Å or greater. For example, the solid nano-ordered carbon product can have an interspacing of about 3.4 Å, about 3.5 Å, about 3.6 Å, about 3.7 Å, about 3.8 Å, about 3.9 Å, or greater. In some examples, the solid nano-ordered carbon product can have an interspacing of about 3.4 Å to about 3.9 Å, about 3.5 Å to about 3.9 Å, about 3.6 Å to about 3.9 Å, about 3.7 Å to about 3.9 Å, about 3.8 Å to about 3.9 Å, about 3.4 Å to about 3.7 Å, about 3.5 Å to about 3.7 Å, or about 3.6 Å to about 3.7 Å.

In other embodiments, the carbonization process can also produce a solid nano-ordered carbon product with nanopores encased by curved or entangled graphene sheets. The carbonization process can be conducted in a one-step or a multi-step process such as a two-step process. In a one-step process the carbonization occurs immediately at the desire temperature range. In a multi-step process the intermediate products can be pre-carbonized at a temperature, such as less than 1,200° C. or less than 1,000° C. in a two-step process, to remove volatiles. The next step in the multi-step process can be to anneal the pre-carbonized intermediate product at a greater temperature to finalize forming the solid nano-ordered carbon product.

The solid nano-ordered carbon products can be prepared from the liquid refinery hydrocarbon product at a product weight yield of about 50%, about 55%, about 60%, about 65%, about 70%, about 75%, about 80%, about 85%, about 90%, or greater during the method 100. For example, the solid nano-ordered carbon products can be prepared from the liquid refinery hydrocarbon product at a product weight yield of about 50% to about 90%, about 60% to about 90%, about 70% to about 90%, about 80% to about 90%, about 50% to about 75%, about 60% to about 75%, or about 70% to about 75% during the method 100.

The method 100 for preparing the solid nano-ordered carbon can include and/or omit different operations 110-140 and/or processes as described and discussed herein. The method 100 can also include other processes before, after, in between, or during any of the operations 110-140. In one or more examples, the method 100 includes exposing the liquid refinery hydrocarbon product to the first functionalization agent to produce the first solid functionalized product during the first functionalization process (operation 110). The first functionalization agent contains at least one element selected from oxygen, sulfur, phosphorous, nitrogen, or any combination thereof. The method 100 further includes exposing the first solid functionalized product to the second functionalization agent to produce the second solid functionalized product during the second functionalization process (operation 130). The second functionalization agent contains at least one element selected from oxygen, sulfur, phosphorous, nitrogen, or any combination thereof. The method 100 also includes carbonizing the second solid functionalized product at a temperature of about 1,000° C. to about 1,400° C. to produce the solid nano-ordered carbon product during the carbonization process (operation 140).

In other examples, the method 100 includes exposing the liquid refinery hydrocarbon product to the first oxidizing agent to produce the first solid functionalized product during the first oxidation process (operation 110). The first solid functionalized product contains about 1 wt % to less than 15 wt % of oxygen. The method 100 further includes purifying the first solid functionalized product during the purification process (operation 120). The method 100 also includes exposing the first solid functionalized product to the second oxidizing agent to produce the second solid functionalized product during the second oxidation process (operation 130). The second solid functionalized product contains 15 wt % to about 50 wt % of oxygen. The method 100 further includes carbonizing the second solid functionalized product at a temperature of about 1,000° C. to about 1,400° C. to produce the solid nano-ordered carbon product during the carbonization process (operation 140).

In some examples, the method 100 includes exposing the liquid refinery hydrocarbon product to the first oxidizing agent to produce the first solid functionalized product during the first oxidation process (operation 110). The liquid refinery hydrocarbon product has a boiling point of about 260° C. to about 704° C., an average molecular weight of about 100 to about 400, and an average number of aromatic rings of 2 to about 10. The first solid functionalized product contains about 1 wt % to less than 15 wt % of oxygen and has an average molecular weight of about 400 to about 1,500. The method 100 also includes purifying the first solid functionalized product during the purification process (operation 120) and exposing the first solid functionalized product to the second oxidizing agent to produce the second solid functionalized product during the second oxidation process (operation 130). The second solid functionalized product contains 15 wt % to about 30 wt % of oxygen. The method 100 further includes carbonizing the second solid functionalized product at a temperature of about 1,050° C. to about 1,250° C. to produce the solid nano-ordered carbon product during the carbonization process (operation 140).

Figure 2:
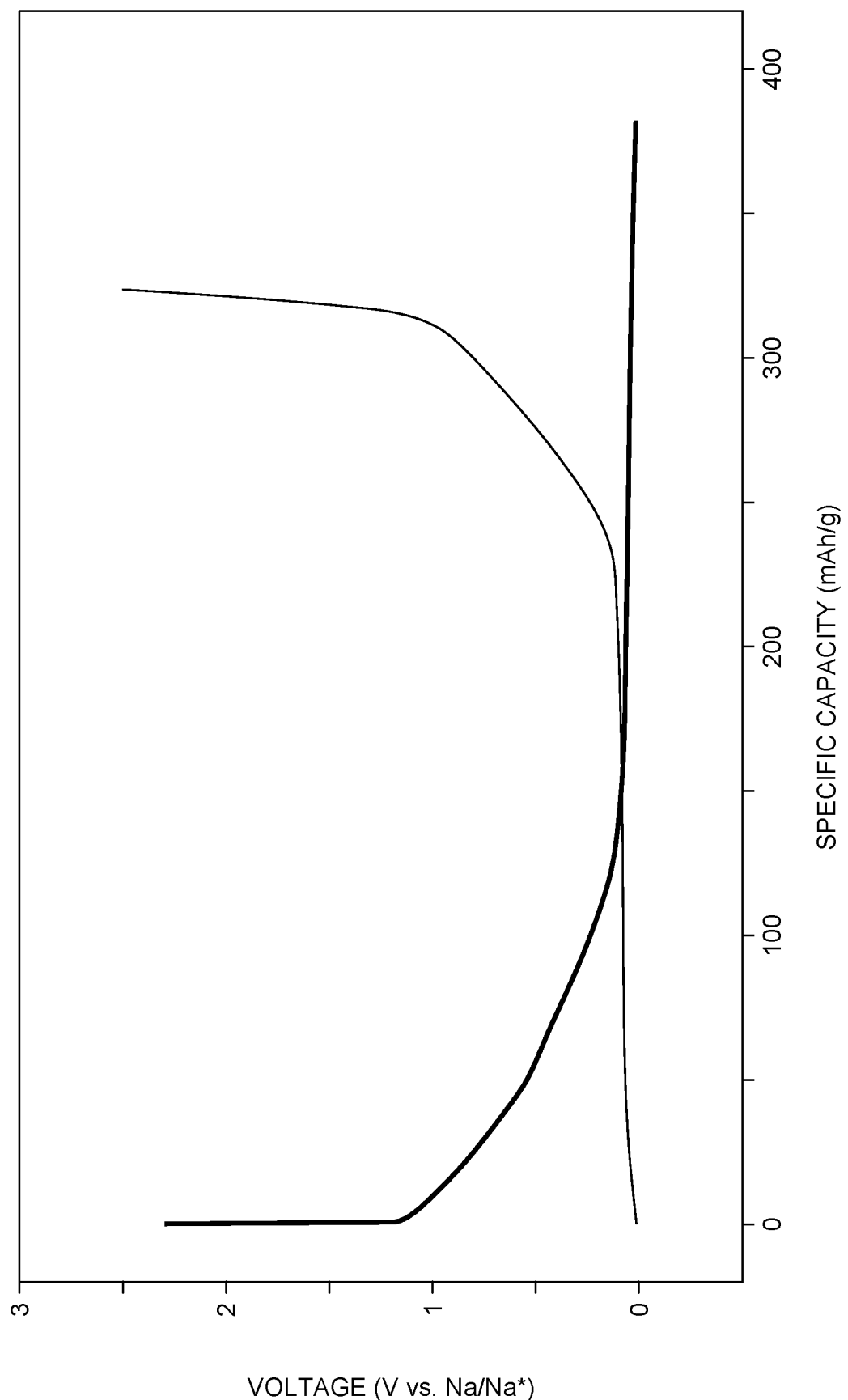
FIG. 2 is a graph showing discharge/charge profiles during the first cycle of battery half-cells containing solid nano-ordered carbon products prepared by methods described and discussed herein.

In one or more embodiments, the solid nano-ordered carbon product can be used to reversibly store sodium-ions in sodium batteries. The solid nano-ordered carbon product can produce 300+ mAh/g specific capacity with the FCE of greater than 82% to about 96% during a first cycle test in a sodium-ion batteries half-cell test. FIG. 2 is a graph showing discharge/charge profiles during the first cycle. The initial sodiation (discharge as shown by the thicker line) started at about 1 V to about 1.2 V, usually due to the interfacial interaction between electrolyte solution and carbon surface. The potential dropped as the sodium-ion storage capacity increased until the profile came to a turning point where the potential started to change in a much slower pace while the capacity soared. Therefore, the total capacity for sodium-ion storage includes of two fractions: capacity in the sloping section (>0.15 V) and capacity in the plateau region (<0.15 V). When charged back, the potential-capacity profile (shown as the thinner line) proceeded in a reversed order: plateau region followed by sloping region. The achieved desodiation capacity is less than sodiation capacity due to irreversible side reactions. The ratio of desodiation capacity to sodiation capacity is referred to as first cycle efficiency. In other embodiments, it has been shown that solid nano-ordered carbon product can be used to reversibly store lithium ions in lithium-ion batteries.

In one or more embodiments, it has been surprisingly and unexpectedly shown that the solid nano-ordered carbon product heated and carbonized at a temperature within a predetermined narrow range (e.g., about 1,000° C. to about 1,400° C. and narrower ranges) during the carbonization process has advantageous properties as an anode material within lithium-ion batteries. The solid nano-ordered carbon products produced by the methods described and discussed herein have relatively high storage capacities (e.g., about 400 mAh/g to about 550 mAh/g or greater) and high first cycle efficiency (FCE) values (e.g., about 58% to about 80%) when used as an anode material within lithium-ion batteries.

EXAMPLES

In order to provide a better understanding of the foregoing discussion, the following non-limiting examples are offered. Although the examples can be directed to specific embodiments, they are not to be viewed as limiting the scope of the invention in any specific respect.

Five different methods of producing solid nano-ordered carbon were done

In Example 1, 50 g slurry oil fraction (>440° C.) was heat soaked at 350-450° C. and 10-150 psig for 2-10 h in a Parr reactor which was purged with nitrogen during the process. The precursor usually has a higher average molecular weight than the feedstock. This precursor was then oxidized with static air in a muffle furnace. The furnace temperature ramped to a desired temperature (from about 300° C. to about 375° C.) at 3° C./min and hold for 3 h. The oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 1 is designated as NOC I.

Example 2

In Example 2, around 25 g slurry oil heavy fraction (>440° C.) was initially functionalized into first solid functionalized product with sufficient oxygen content and softening point by mild oxidation. This step was accomplished in a muffle furnace with natural convection of air at a temperature from about 200-350° C. for about 2-24 hours. The first solid functionalized product should contain up to 5 wt % of oxygen and have a softening point higher than 120° C. The initially oxidized product was crushed with ball mill into powder (D50=20-200 μm). The powder was fully oxidized in a muffle furnace with natural convection of air, at a temperature from about 280° C. to about 320° C. for about 3 hours, to further functionalize and crosslink the molecules. The oxygen content of the deeply oxidized product ranges from 20 wt % to about 35 wt %. Lastly, the deeply oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 2 is designated as NOC II.

Example 3

In Example 3, around 25 g slurry oil heavy fraction (>440° C.) was initially functionalized into first solid functionalized product with sufficient oxygen content and softening point by mild oxidation. This step was accomplished in a muffle furnace with natural convection of air at a temperature from about 200-350° C. for about 2-24 hours. The first solid functionalized product should contain up to 5 wt % of oxygen and have a softening point higher than 120° C. The first functionalized solid product was then purified by solvent extraction. The intermediate was soaked in heptane in a weight ratio of 1:10 at 50-60° C. for 2 hours with continuous stirring. The solid in the suspension was then filtered out and dried at 80° C. overnight. The purified product was crushed with ball mill into powder (D50=20-200 μm). The powder was fully oxidized in a muffle furnace with natural convection of air, at a temperature from about 280° C. to about 320° C. for about 3 hours, to further functionalize and crosslink the molecules. The oxygen content of the deeply oxidized product ranges from 20 wt % to about 35 wt %. Lastly, the deeply oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 3 is NOC II type.

Example 4

In Example 4, The heavy fraction (about 500+° C.) of slurry oils were used as feedstocks for preparing hard carbon products. For each test, the following process was performed: 1) fully dissolve the slurry oil in xylene (xylene/slurry oil weight ratio 4:1) to form a homogenous mixture; 2) heat the mixture to 65° C. in a silicon oil bath; 3) add concentrated H2SO4 (98 wt. %) into the mixture with acid to slurry oil weight ratio of 0.6:1; 4) heat the resulting mixture to the boiling point of xylene (140° C.-150° C.) within 20 min to complete the reaction; 5) additional boiling xylene (xylene/slurry oil weight ratio 2:1) was added to the boiling mixture upon the completion of reaction to fully precipitate the xylene insoluble products; 6) remove the heat and cool the mixture to room temperature (about 23° C.); 7) filter the mixture, wash with xylene, collect and dry the solid product; 8) the solid powder was further oxidized in a muffle furnace with natural convection of air, at a temperature from about 280° C. to about 320° C. for about 3 hours, to further functionalize and crosslink the molecules; 9) heat the resulting powder in a tube furnace at a rate of 5° C./min to 1,400° C. and hold for two hours under a nitrogen atmosphere to complete carbonization. The nano-ordered carbon product generated from Example 4 is NOC II type

Example 5

In Example 5, About 100 grams of heavy fraction (about 500+° C.) of slurry oil was heated to 100° C. and charged into a 300 mL Parr reactor vessel and 50 g of sulfur powder (99.98%, Sigma-Aldrich®) was then added to the same vessel. The mixture was manually mixed for 10 min before the vessel was installed and sealed. Sulfurization was carried out in nitrogen with controlled pressure between 50 psi and 100 psi during slow and controlled temperature ramping from room temperature to 200° C., after which the back pressure regulator was completely closed and major reaction seemed to happen based on observed pressure hikes until heating was discontinued at 260° C. The sulfurized slurry material collected as small solid pieces was balled milled and sieved through 50 mesh to obtain a powder material. The powder material was dispersed in heptane heated on a hot plate set at 60° C. for 3 hours with continuous stirring, after which the solid in the suspension was filtered out and dried at 60° C. in vacuum overnight. The dried sample was heated in a muffle furnace for oxidation at the desired temperature for a certain duration. The oxidized powder was heated in a tube furnace at a rate of 5° C./min to 1,400° C. and hold for two hours under a nitrogen atmosphere to complete carbonization. The nano-ordered carbon product generated from Example 5 is NOC II type.

Tests

The following tests were run on the nano-ordered carbon materials made from Examples 1 and 2. TGA-TPO Analysis of pre-functionalized liquid refinery hydrocarbon product. Samples for XRD analysis were packed loosely onto a silicon wafer low-background XRD sample holder and leveled to achieve a flat surface. XRD data was acquired on a diffractometer operated in θ-θ geometry with a copper X-ray source (Cu kα λ=1.54059 Å), divergent beam primary beam X-ray optics, and a Vantec1 position sensitive detector. Scans were acquired from 5° to 85° 2θ with a 0.03189° step size.

Electrochemical Tests

The electrochemical tests were performed on a battery cycling tester in a voltage range of 0.01 V to 2.5 V. The electrical charge passed during charging and discharging on each cycle was recorded and used to calculate the specific capacity and coulombic efficiency. All the tests were conducted at ambient temperature.

Coin cells for the electrochemical tests were made form disks with 1.5 cm diameter were punched out from the electrode films using a die cutter. The mass loading of active materials on these disks varied from 5 mg/disc to 6 mg/disc. Each coin cell was prepared in an argon-filled glovebox by sequentially stacking a Na metal as anode, separators, an electrode disk as cathode, a stainless steel disk spacer, and a wave spring in a bottom can. The electrolyte was added to the separators before the electrode disk was stacked. An electrolyte of 1 M $NaPF_6$ in 50 vol % ethylene carbonate and 50 vol % dimethyl carbonates was used. After the top can was dropped onto the stack, the assembly was transferred to the coin cell crimper and crimped together.

Electrodes for the coin cells were prepared from casting a mixture of the nano-ordered carbon, alginate binder, and carbon black in a weight ratio of 90:5:5 in water onto a carbon-coated aluminum substrate and drying in a vacuum oven at 80° C. for 1 hour.

Results

Figure 3:
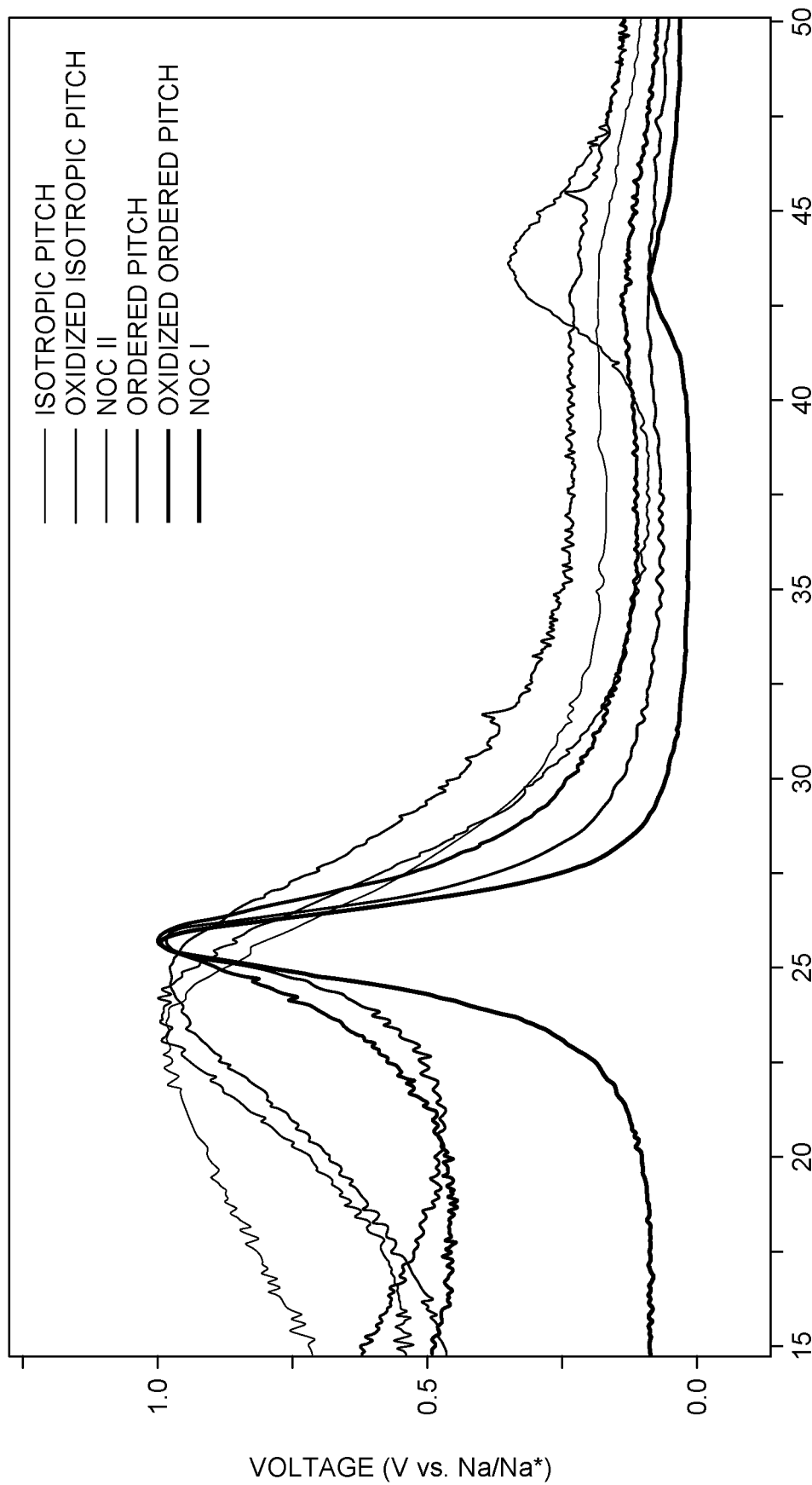
FIG. 3 is a graph showing XRD patterns of various carbon products prepared by methods described and discussed herein.

The XRD pattern, see FIG. 3, of the pre-functionalized refinery hydrocarbon intermediate from Example 2 (isotropic pitch) shows a very broad peak at 28<25°, in contrast to a sharp peak for the pre-functionalized intermediate from Example 1 (ordered pitch) at 2θ≈26°. This indicates that the isotropic pitch intermediate from Example 2 has less ordered structure, represented by larger average d-spacing (d002=about 3.6 Å to about 4.5 Å) and wider distribution of d-spacing. The ordered pitch intermediate from Example 1 on the contrary, has more ordered structure with higher crystallinity, represented by smaller average d-spacing (d002=about 3.4 Å to about 3.6 Å) and narrower distribution of d-spacing. After deep oxidation, the oxygen contents of intermediates from both methods increased to about 20 wt % to about 30 wt %. However, the deeply oxidized isotropic pitch intermediate from Example 2 still shows less ordered structure (broader d002 peak at lower angle) compared to oxidized ordered pitch from Example 1. It is theorized that the less ordered structure in the oxidized intermediates can help prevent growth of crystallite structure during carbonization process. As a result, after carbonization step, NOC I material from Example 1 has a highly crystallite structure with smaller average d-spacing (d002=about 3.4 Å to about 3.6 Å) and narrower distribution of d-spacing. In contrast, NOC II material from Example 2 possessed larger average d-spacing (d002=about 3.6 Å to about 3.9 Å) and wider distribution of d-spacing. It is theorized that the larger average d-spacing could facilitate interaction of sodium ions between graphene sheets.

In addition to d-spacing, NOC I and NOC II could also be distinguished by porous structure. With less ordered structure, NOC II material from Example 2 has more pores. As a result, NOC II has lower true density (1.2-1.8 g/cc) compared to that of NOC I (1.8-2.3 g/cc). It is theorized that the porous structure could allow formation of sodium-ion nano-cluster, resulting in increased capacity.

Figure 4:
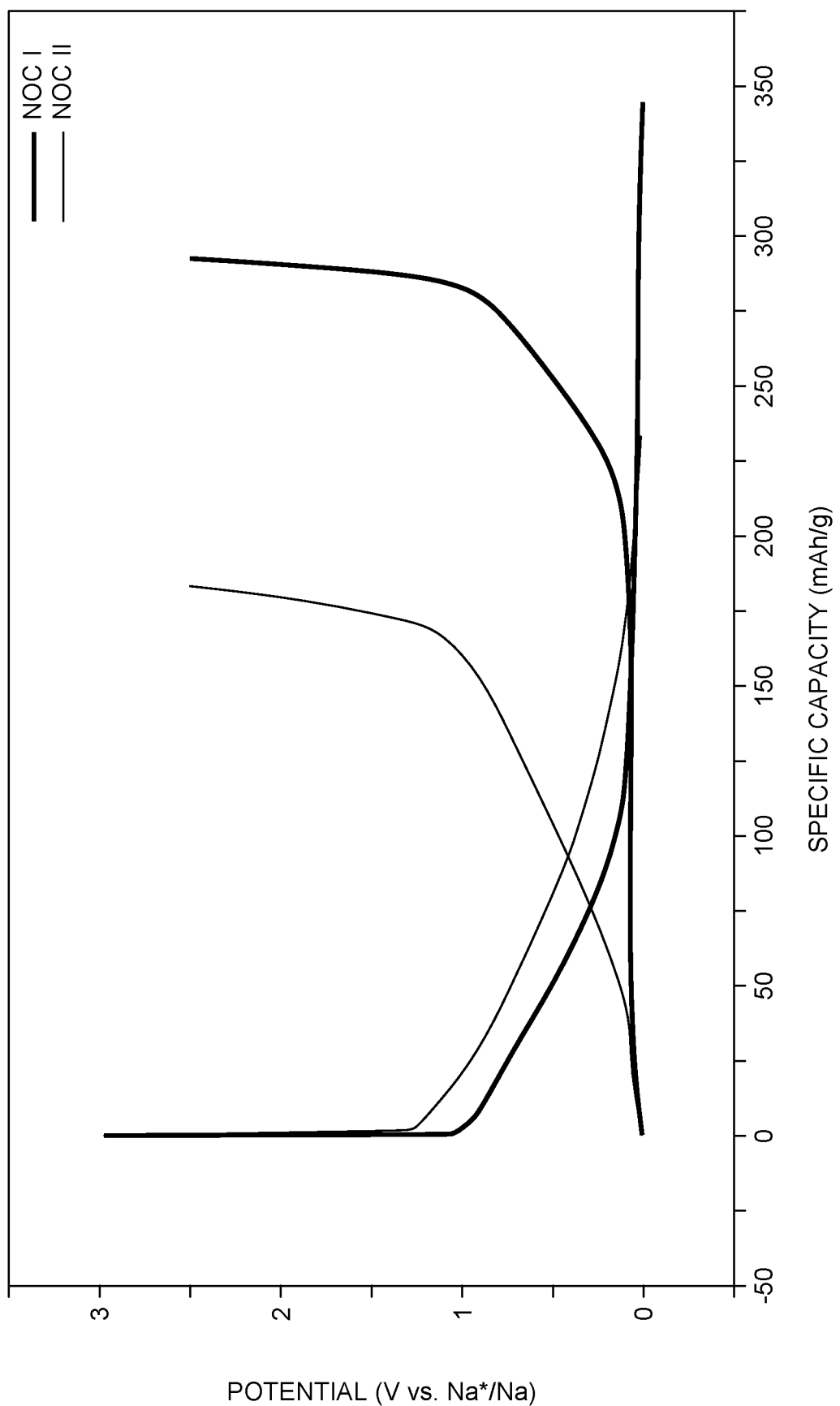
FIG. 4 is a graph showing discharge/charge profiles during the first cycle of battery half-cells containing solid nano-ordered carbon products prepared by methods described and discussed herein.

In order to verify whether the proposed mechanism works for the nano-ordered carbon materials, the nano-ordered carbon materials from Example 1 and Example 2 were tested in Na ion battery half cells. As shown in FIG. 4, NOC II from Example 2 delivered a reversible capacity of 293 mAh/g in the first cycle, significantly higher than that of NOC I material from Example 2. The largest difference between their performances is the contributions from sloping (>0.15 V) and plateau (<0.15 V) regions. The majority of the capacity from NOC II is from the plateau region (>200 mAh/g) while the NOC I material relies on the capacity in the sloping area. According to the DFT calculations in literature, the charge-discharge in the plateau area could be related to intercalation-deintercalation of Na ions between the graphene sheets and formation of nano-clusters in the pores of nano-ordered structure while the sloping capacity could be mainly due to absorption of Na ions on active sites in the material.

Table 1 summarized the performance of nano-ordered carbon materials prepared from Example 1, 2, 3, 4, and 5 with optimized functionalization conditions while keeping constant carbonization conditions. The nano-ordered carbon material generated from Example 1 is NOC I type while Example 2-5 produced NOC II type products. Among different methods, $1^{st}$ functionalization by air oxidation followed by solvent extraction and $2^{nd}$ air oxidation generated nano-ordered carbon with the highest capacity and first cycle efficiency.

TABLE 1

| | $1^{st}$ Functionalization | Purification | $2^{nd}$ Functionalization | Specific Capacity (mAh/g) | First Cycle Efficiency (%) |
|---|---|---|---|---|---|
| Example 1 | Heat soak | N/A | Air oxidation | 180 | 75 |
| Example 2 | Air oxidation | N/A | Air oxidation | 293 | 85 |
| Example 3 | Air oxidation | Solvent | Air oxidation | 328 | 86 |
| Example 4 | Acid oxidation | Solvent | Air oxidation | 310 | 80 |
| Example 5 | Sulfurization | Solvent | Air oxidation | 300 | 78 |

As shown in Table 2, the nano-ordered carbon material (NOC II) produced from Example 2 was compared to hard carbon made from the best performing commercial product made from refinery hydrocarbon products and two different hard carbon materials made from biomass.

TABLE 1

| | Feedstock | Reversible Capacity (mAh/g) | First Cycle Efficiency (%) |
|---|---|---|---|
| Commercial Hard Carbon 1 | Refinery Hydrocarbon | 200 | 80 |
| Commercial Hard Carbon II | Biomass | 300 | 84-93 |
| Commercial Hard Carbon III | Biomass | 198 | 81 |
| Example 3 | Refinery Hydrocarbon | 328 | 86 |

It is clearly shown in Table 2, that NOC II from Example 3 outperformed the hard carbon batteries made from refinery hydrocarbon products while obtaining relatively comparable properties of hard carbon batteries made from biomass feedstock. It is important to note that while Example 2 was able to achieve similar properties to Commercial Hard Carbon II its ability to use a lower cost feedstock and higher effective yield of about 50% to about 70% (compared to 10%-20% for previously known methods with biomass feedstock) makes Example 3 an improvement over currently known technology.

Further Analysis into the Example 1

Based upon the above test results, the heat soaked ordered pitch intermediates were oxidized at temperatures of about 300° C., about 325° C., about 350° C., and about 375° C. The samples were labeled OX300, OX325, OX350, and OX375, respectively. Afterwards, they were characterized with select methods to investigate how the oxidation step changed the chemical and physical characteristics. The chemical traits of the first solid functionalized product surface were first analyzed by XPS.

To analyze the samples with XPS, each sample was analyzed using a monochromatic Al Kα x-ray source at a beam diameter of 200 μm, an analyzer take-off-angle of 45°, and a chamber pressure of about 9 Torr to about 10 Torr. Charge compensation was achieved by flooding the surface with low energy electrons to eliminate charging due to photoelectron emission and low energy argon ions to dissipate static charging. Charge referencing was achieved by setting the most intense feature in the carbon region to 285.0 eV. Atomic percentages of carbon and oxygen (outer 10 nm) were determined from the average result of three survey scans collected at different locations along the sample. Survey scans were performed at a pass energy of 280 eV for 10 sweeps. Samples were run as received.

Figure 5:
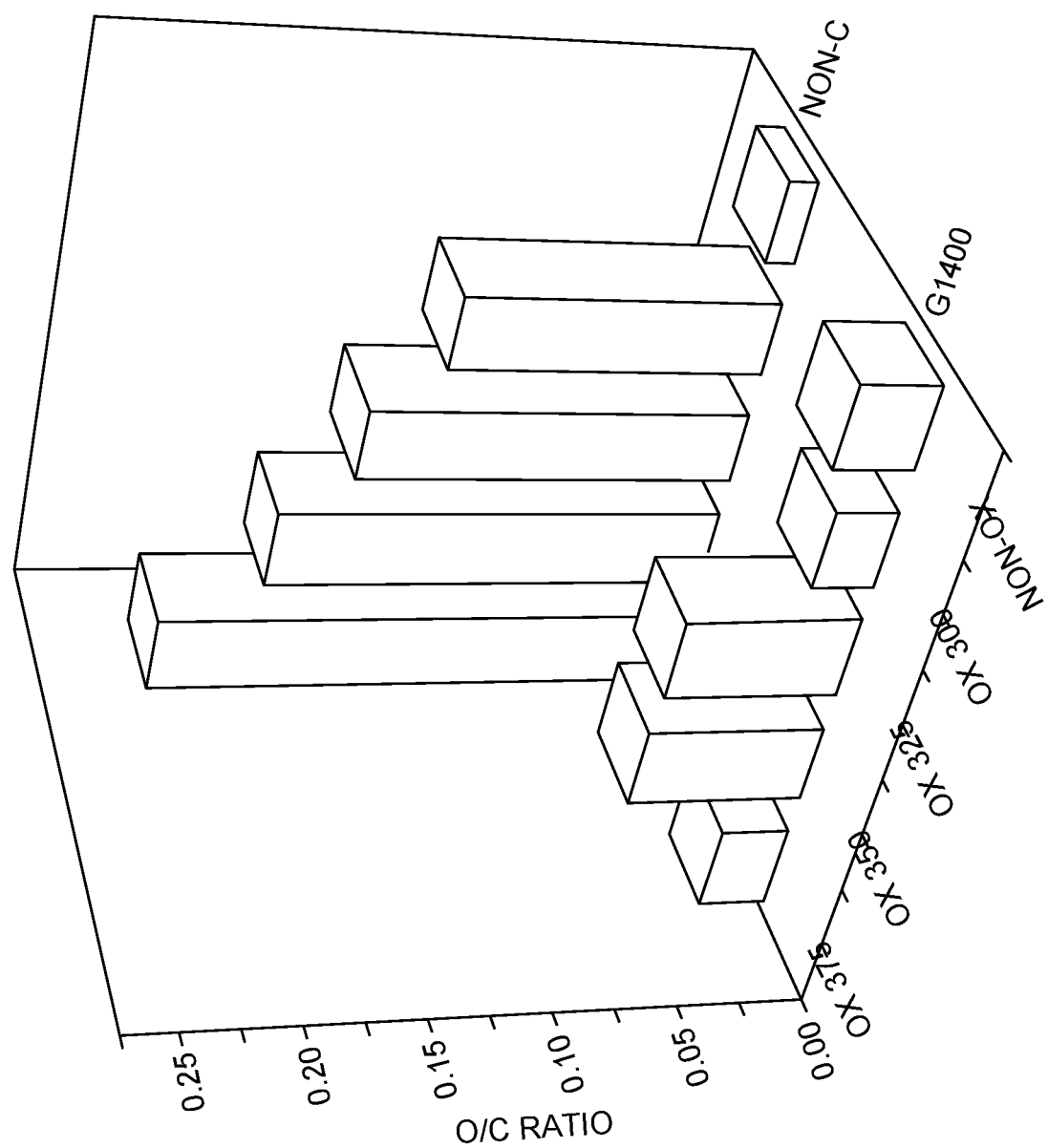
FIG. 5 is a graph showing oxygen-carbon ratios of carbon products prepared by methods described and discussed herein.

FIG. 5 shows the surface O/C molar ratios for the oxidized ordered pitches and carbonized NOC I materials. X and Y axes represent the process conditions (X for oxidation and Y for carbonization) for each material. Specifically, non-OX refers to non-oxidation, non-C is short for non-carbonization, and C1400 stands for carbonization at 1,400° C. A significant change in the O/C ratio was observed on the pitch surface after oxidation, increasing from 0.01 to over 0.10. The oxidized pitch materials also demonstrated a direct relationship between O/C ratio and oxidation temperature, rising from 0.13 at 300° C. to 0.24 at 375° C.

Figure 6:
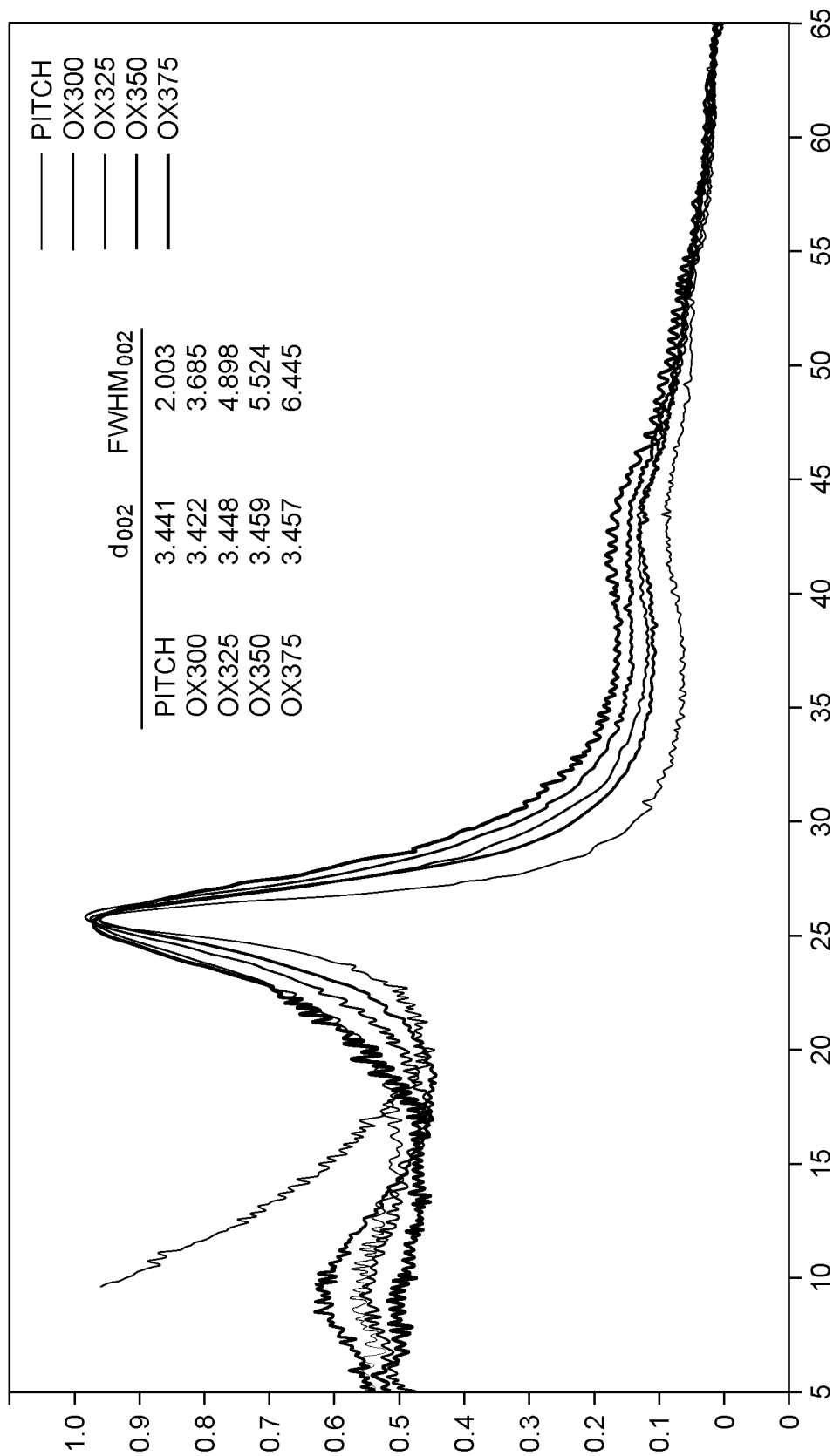
FIG. 6 is a graph showing XRD patterns of various carbon products prepared by methods described and discussed herein.

Further XRD analysis into samples OX300, OX325, OX350, and OX375 were performed as shown in FIG. 6. The most prominent feature is a peak at –26° 28, corresponding to the (002) peak of graphite-like materials. The average d-spacings of the oxidized pitches slightly increased from 3.422 Å to only 3.457 Å with increasing oxidation temperature.

Figure 7A:
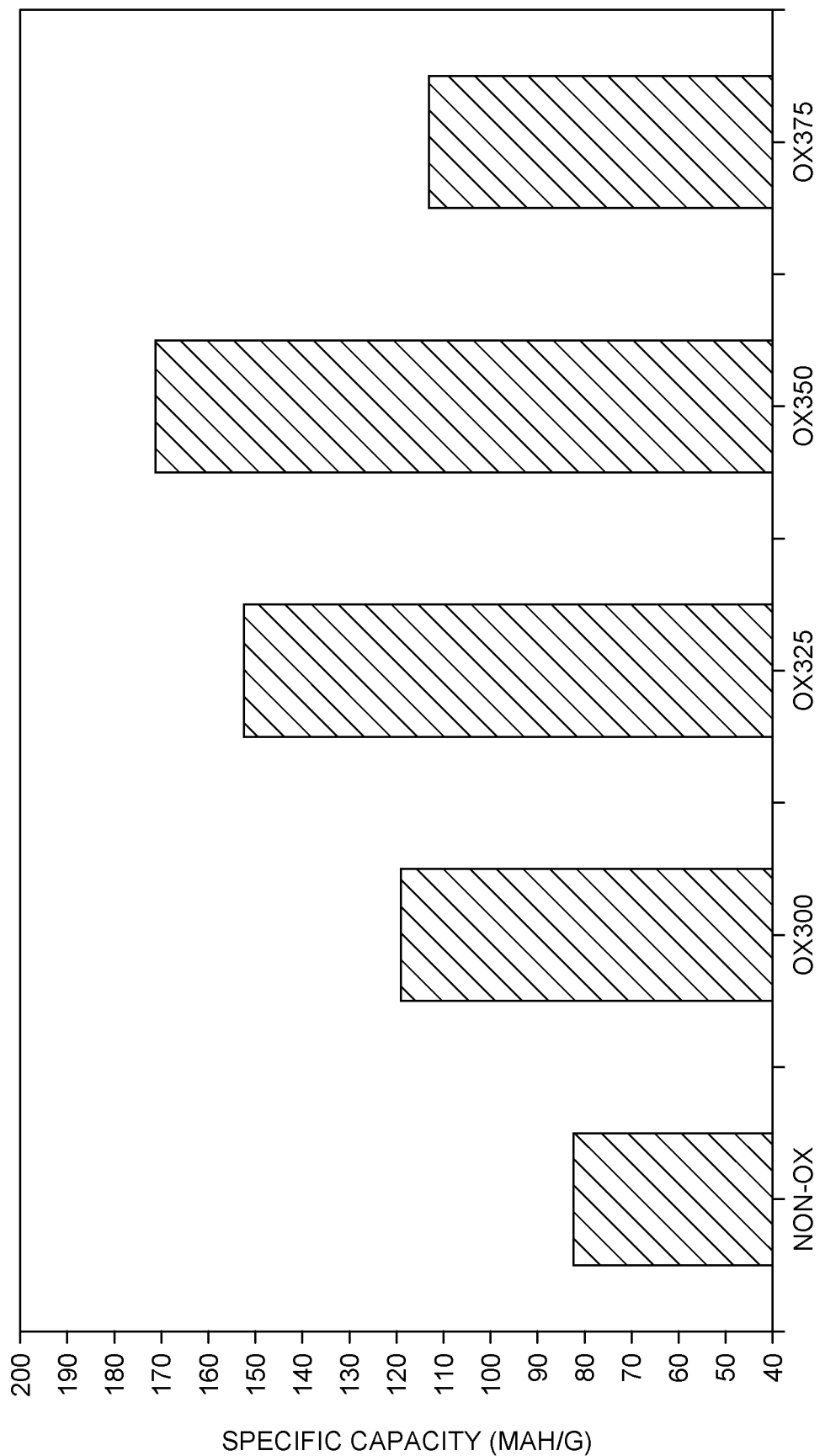
FIGS. 7A-7B are graphs showing specific capacity profiles during a first cycle of battery half-cells containing solid nano-ordered carbon products prepared by methods described and discussed herein.
Figure 7B:
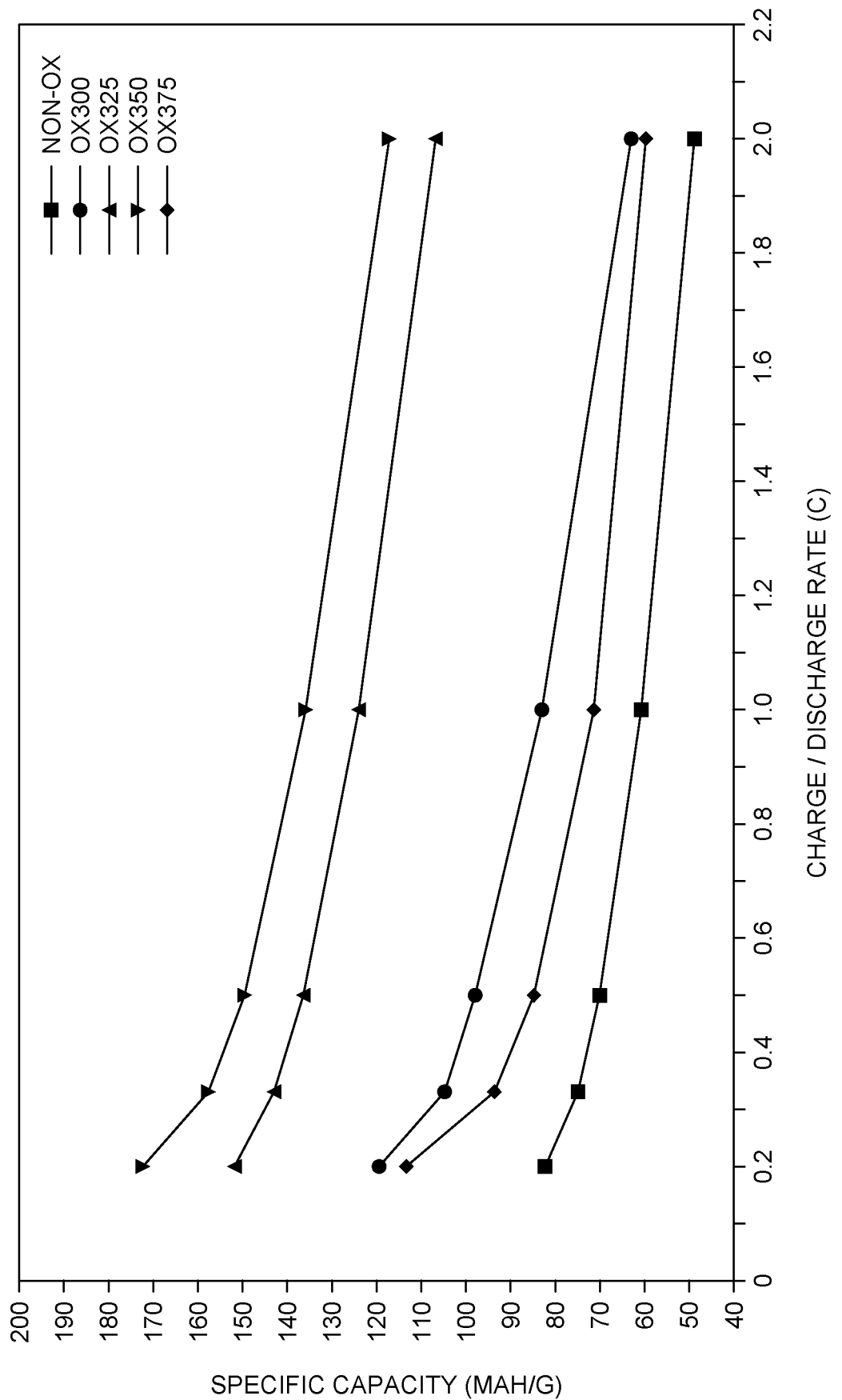

Samples OX300, OX325, OX350, and OX375 were then fabricated into electrodes that were incorporated into sodium-ion half-cells to evaluate the Na ion storage capabilities. The results are shown in FIG. 7. The Non-OX-C1400 refers to a sample that did not have the step of functionalization went immediately from a refinery hydrocarbon product to carbonization at 1,400° C. The reference sample, Non-OX-C1400, showed the lowest specific capacity (about 80 mAh/g) when charged and discharged at C/5 rate. In contrast, all the oxidized NOC materials delivered higher capacities. Furthermore, the capacities of these materials increased with oxidation temperature until it reached about 174 mAh/g at 350° C. Above this temperature, the capacity of OX-375 dropped to about 115 mAh/g. The same performance trend holds for all the materials when charged and discharged at different rates (FIG. 7B).

Further Analysis into the Example 2

Figure 8:
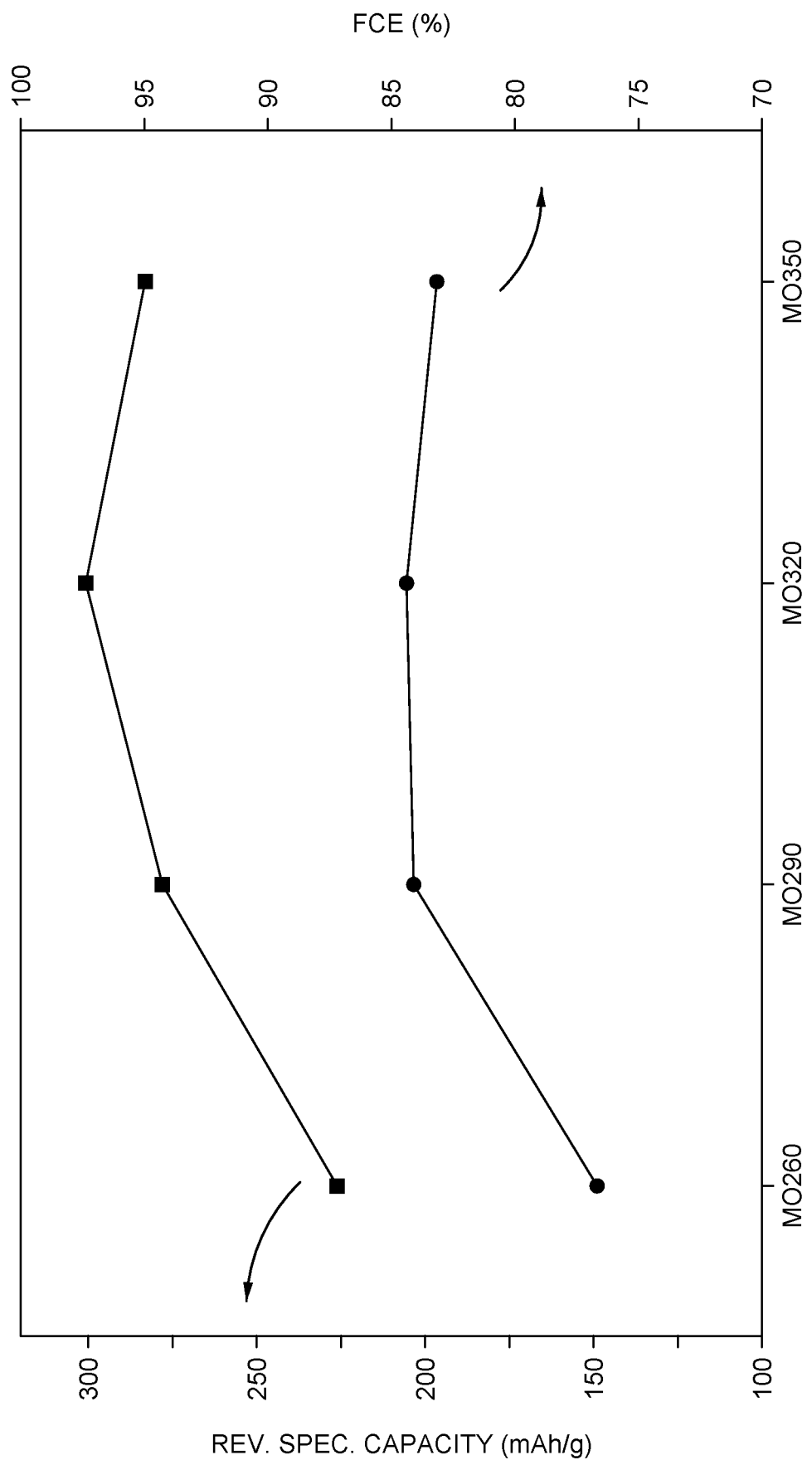
FIG. 8 is a graph showing reverse specific capacity and first cycle efficiencies (FCEs) of battery half-cells containing solid nano-ordered carbon products prepared by methods described and discussed herein.

FIG. 8 compares the performances of nano-ordered carbon materials (NOC II) that were mildly oxidized at different temperatures (260° C., 290° C., 320° C., and 350° C.) before being subjected to full functionalization at 300° C. The materials generated from these processes were labeled as M0260, M0290, M0320, and M0350 respectively. It appears that the overall performance—mainly reversible specific capacity and first cycle efficiency (FCE)—of the final product increased with mild oxidation temperature and reached a maximum (301 mAh/g specific capacity and 84.5% FCE) at 320° C. The mild oxidation may lead to insufficient functionalization and crosslinking during the deep oxidation step, which is indicated by the oxygen contents in the intermediates from the two steps, as shown in Table 3. The degree of functionalization and crosslinking may play a critical role in developing nano-ordered structure—interspace between flexible graphene sheets and nanopores encased by curved or entangled graphene stacks/sheets—that is proper for sodium-ion storage.

TABLE 3

| Sample | Oxygen Content (wt %) | | |
|---|---|---|---|
| | Feedstock | After Mild Oxidation | After Deep Oxidation |
| M0260 | 2.16 | 2.74 | 15.21 |
| M0290 | 2.16 | 3.2 | 25.9 |
| M0320 | 2.16 | 4.8 | 28.31 |
| M0350 | 2.16 | N/A | 27.2 |

The degree of functionalization and crosslinking may play a critical role in developing nano-ordered structure—interspace between flexible graphene sheets and nanopores encased by curved or entangled graphene stacks/sheets—that is proper for sodium-ion storage.

Carbonization Temperature Examples

Examples 6-15

A heavy fraction (930° F.+) of slurry oil was selected as the feedstock to prepare a series of nano-ordered carbon (NOC) materials using the above-described method involving mild oxidation, deep oxidation, and carbonization processes. The carbonization temperature was varied in a range from 1,000° C. to 1,400° C. while the process conditions for other steps remain the same. As such, the second solid functionalized product was the same material used in all of the following examples, Examples 6-15.

Preparation of NOC Materials

The NOC materials were prepared from the heavy fractions (>930° F.) of the selected slurry oils. In a typical experiment, 5 g heavy cut was first placed in a large rectangle crucible and oxidized in a muffle furnace with a programmed temperature profile (ramp to 320° C. at 3° C./min and hold for 24 h). During the temperature ramp, the solid sample melted and formed a thin liquid layer at the bottom of the crucible. As the oxidation time increased, the liquid layer became solidified and transitioned to isotropic pitch. After the mild oxidation, the isotropic pitch was ground into powder with mortar and pestle. The powdered pitch was set in the muffle furnace again for deep oxidation at 300° C. for 3 h. The highly oxidized pitch was carbonized in a laboratory tube furnace under nitrogen atmosphere with a stepped temperature program (ramp to a desired temperature at 5° C./min and hold for 2 h).

XRD Characterization of NOC Materials

Samples for XRD analysis were packed loosely onto a silicon wafer low-background XRD sample holder and leveled to achieve a flat surface. XRD data was acquired on a Bruker D8 Advance diffractometer operated in θ-θ geometry with a copper X-ray source (Cu Kα λ=1.54059 Å), divergent beam primary beam X-ray optics, and a Vantec1 position sensitive detector. Scans were acquired from 5° to 85° 2θ with a 0.03189° step size.

Preparation of Electrode

The electrodes were prepared by casting a well-mixed dispersion of NOC:alginate binder:carbon black (90:5:5 in weight) in water onto a carbon-coated aluminum substrate with a doctor blade to form a thin film. The electrode film was then dried in a vacuum oven at 80° C. for 1 h.

Preparation of Na-Ion Coin Cells (Examples 6-10)

Disks with 1.5 cm diameter were punched out from the electrode films using a die cutter (MTI™ MSK-T-07). The mass loading of active materials on these disks varied from 5 to 6 mg/disc. Each sodium-ion coin cell was prepared in an argon-filled glovebox by sequentially stacking a Na metal as anode, a separator (a layer of Whatman® glass fiber filter), an electrode disk as cathode, a stainless steel disk spacer, and a wave spring in a bottom can. An electrolyte of 1 M $NaPF_6$ in 50 vol % ethylene carbonate and 50 vol % dimethyl carbonate (purchased from Sigma-Aldrich®) was added to the separator before the electrode disk was stacked. After the top can was placed over the bottom can, the assembly was crimped and sealed by a coin cell crimper (MTI™ MSK-110).

Preparation of Li-Ion Coin Cells (Examples 11-15)

Disks with 1.5 cm diameter were punched out from the electrode films using a die cutter (MTI™ MSK-T-07). The mass loading of active materials on these disks varied from 5 to 6 mg/disc. Each lithium-ion coin cell was prepared in an argon-filled glovebox by sequentially stacking a Li metal as anode, a separator (a layer of Whatman® glass fiber filter), an electrode disk as cathode, a stainless steel disk spacer, and a wave spring in a bottom can. An electrolyte of 1 M $LiPF_6$ in 40 vol % ethylene carbonate, 30 vol % dimethyl carbonate, and 30 vol % diethyl carbonate (purchased from Sigma-Aldrich®) was injected as electrolyte and added to the separator before the electrode disk was stacked. After the top can was placed over the bottom can, the assembly was crimped and sealed by a coin cell crimper (MTI™ MSK-110).

Electrochemical Test

The electrochemical tests were performed on a battery tester (Neware® BTS4000 for sodium-ion cells and Arbin® potentiostat/galvanostat for lithium-ion cells). The electrical charge passed during each charge/discharge cycle was recorded and used to calculate the specific capacity and coulombic efficiency. All the tests were conducted at ambient temperature (about 23° C.).

Figure 9:
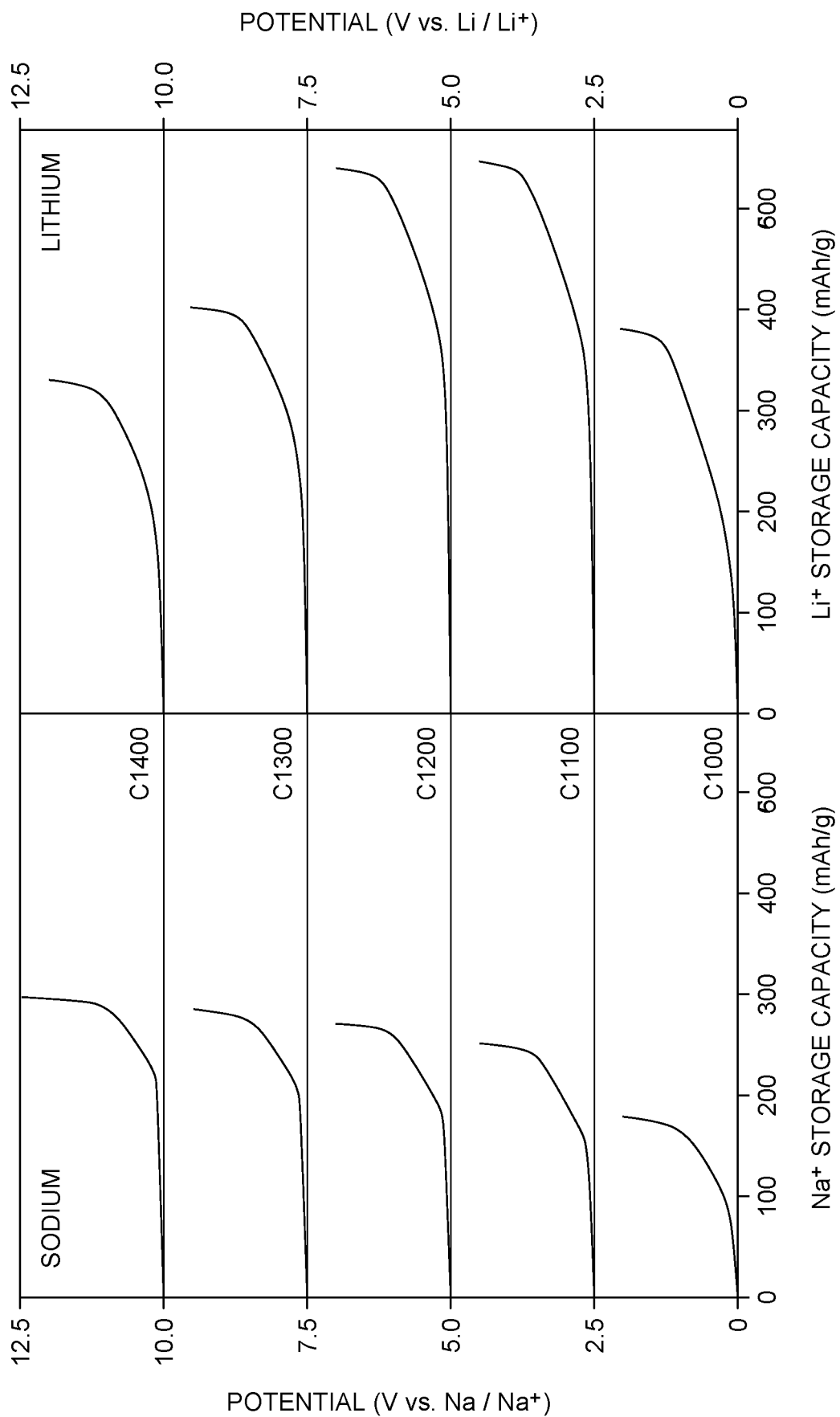
FIG. 9 is a graph showing charge profiles of sodium-ion and lithium-ion half cells containing carbon products prepared at different carbonization temperatures by methods described and discussed herein.

FIG. 9 shows the charge profiles of NOC materials carbonized at 1,000° C., 1,100° C., 1,200° C., 1,300° C., and 1,400° C. (labeled as C1000, C1100, C1200, C1300, and C1400). Each charge profile indicates the reversible specific capacity of the tested material in either sodium-ion half-cell or lithium-ion half-cell. Examples 6-10, respectively labeled as C1000, C1100, C1200, C1300, and C1400 in the sodium-ion half-cell and Examples 11-15, respectively labeled as C1000, C1100, C1200, C1300, and C1400 in the lithium-ion half-cell.

Figure 10:
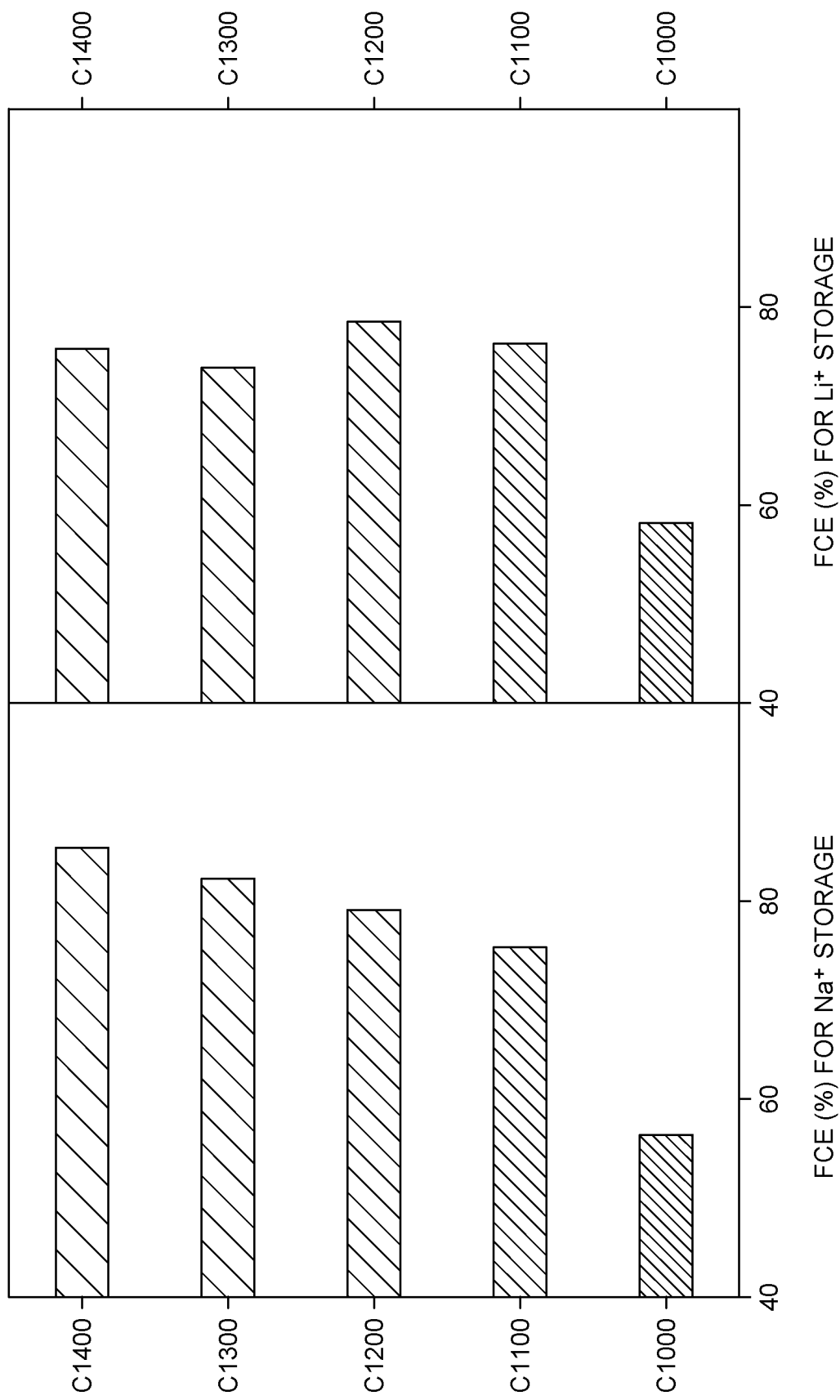
FIG. 10 is a graph showing FCEs of sodium-ion and lithium-ion half cells containing carbon products prepared at different carbonization temperatures by methods described and discussed herein.

In sodium-ion cells (Examples 6-10), the materials carbonized at higher temperatures in the selected range achieved higher specific capacities, with C1400 released the highest amount of charge (about 300 mAh/g). Meanwhile, the first cycle efficiencies (FCE) of these materials followed the same trend (FIG. 10). The trends suggest that a carbonization temperature higher than 1,400° C. might further increase the performance. However, the required temperature for maximizing the material capacity might exceed the practical operating window of an industry calciner. Therefore, a balance between the product performance and practical operating condition needs to be managed in large scale production.

A different trend has been observed in lithium-ion cell tests (Examples 11-15). The highest specific capacity was achieved from the material that was carbonized at relatively lower temperature. For example, C1100 and C1200 delivered a large capacity of around 550 mAh/g, much higher than the theoretical capacity (372 mAh/g) of natural graphite, while C1000, C1300, and C1400 were only able to store reduced amount of charges. Though not fully understood, the capability of storing lithium ions should be closely related to the nano-ordered structure in the carbon materials. The possible sites for Li+ storage hypothetically include defective sites on the plain or edge of graphene sheets, interspace between flexible graphene sheets, and nano-pores encased by curved or entangled graphene stacks/sheets. In contrast, the majority of sites in graphite materials is solely the interspace between orderly stacked graphene sheets. For this reason, the NOC materials with proper structures offer more sites for Li-ion storage and are able to hold higher capacity than graphite.

The trend of FCEs for these materials in lithium-ion cells is not as obvious as the one in sodium-ion cells (FIG. 10). It can be concluded that the FCE leaped from about 58% to about 76%-77% when the carbonization temperature was increased from 1,000° C. to 1,100° C. and 1,200° C. At greater temperatures, the change in FCE is insignificant. It seems the achievable FCE of NOC materials for Li+ storage is currently lower than the optimized FCE for Na+ storage.

Figure 11:
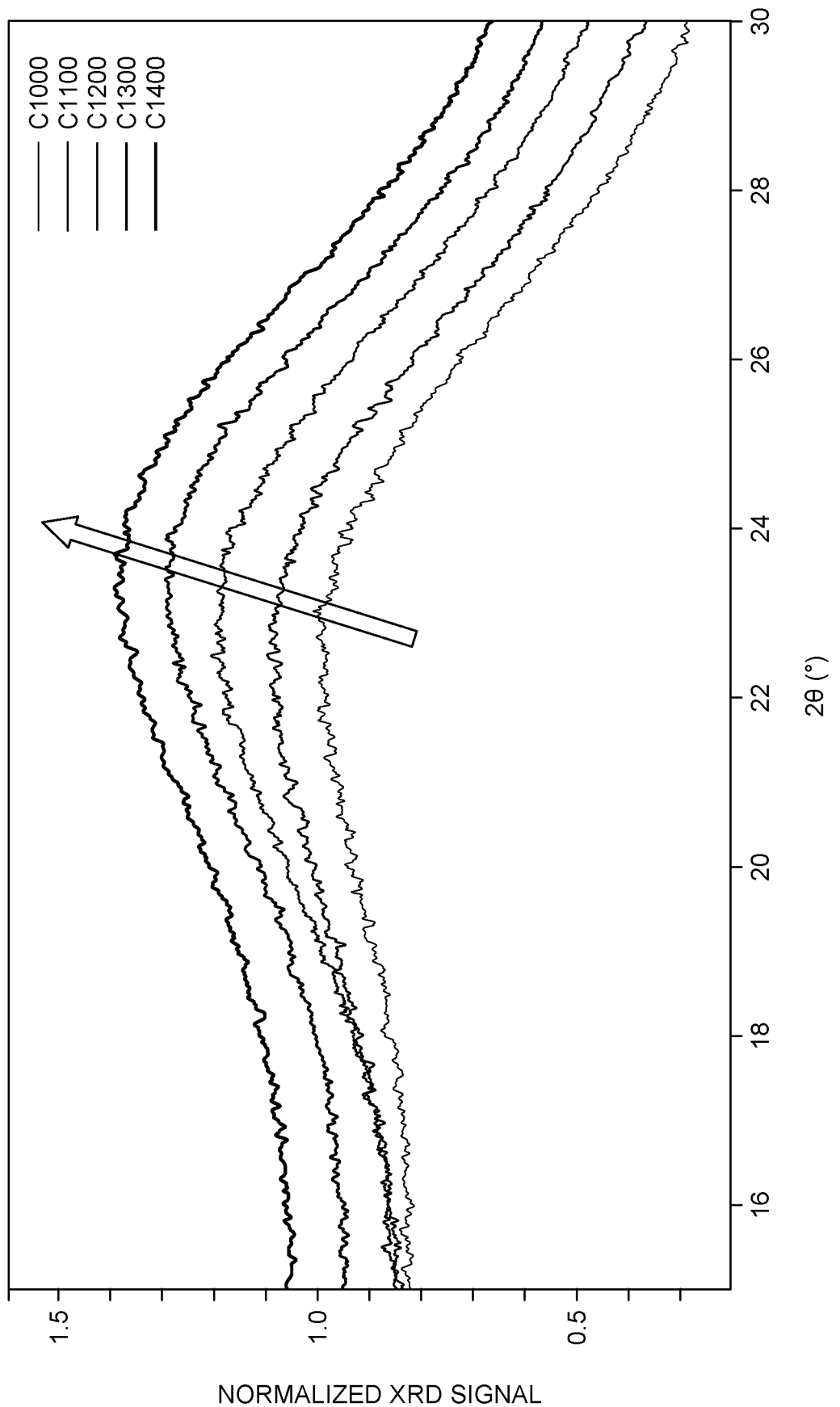
FIG. 11 is a graph showing XRD patterns of various carbon products prepared at different carbonization temperatures by methods described and discussed herein.

The performance trend described above is expected to have been resulted from the structural difference between these samples. FIG. 11 presents X-ray diffraction patterns for them. The locations of the broad d002 peaks (22°-24°) indicate the average d-spacing of nano-scale graphene assemblies in the samples. It appears that the d002 peaks shifted to higher angles, suggesting a slight reduction of the average d-spacing, as the carbonization temperature increased. The initial comparison revealed that the NOC materials with larger d-spacing could hold more Li+ than Na+. A systematic research is ongoing to identify the relationship between the battery performance and material structure, which is adjusted by an even wider range of carbonization temperatures (up to 2,900° C.). The structures of NOC materials are being thoroughly analyzed with a full spectrum of characterization techniques, and then correlated to the electrochemical behavior of cations on the surface and in the body of the carbon particles during charge and discharge.

In summary, the optimum carbonization temperature for materials with maximized Na+ or Li+ storage capability is different. This provides an opportunity for developing differentiated product lines. For anode materials designed for sodium-ion battery applications, the carbonization temperature should be greater than 1,400° C. For anode materials designed for lithium-ion battery applications, the carbonization temperature should be in the range of about 1,000° C. to about 1,400° C., such as about 1,050° C. to about 1,250° C. or about 1,100° C. to about 1,200° C.

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated. As used herein, the term "about" refers to a +/−10% variation from the nominal value. It is to be understood that such a variation can be included in any value provided herein.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A method for preparing a nano-ordered carbon, comprising:
    exposing a liquid refinery hydrocarbon product to a first functionalization agent to produce a first solid functionalized product during a first functionalization process, wherein the first functionalization agent comprises at least one element selected from oxygen, sulfur, phosphorous, nitrogen, or any combination thereof;
    purifying the first solid functionalized product to produce a purified first solid functionalized product;
    exposing the purified first solid functionalized product to a second functionalization agent to produce a second solid functionalized product during a second functionalization process, wherein the second functionalization agent comprises at least one element selected from oxygen, sulfur, phosphorous, nitrogen, or any combination thereof; and
    carbonizing the second solid functionalized product at a temperature of about 1,000° C. to about 1,400° C. to produce a solid nano-ordered carbon product during a carbonization process.

2. The method of claim 1, wherein the second solid functionalized product is heated to a temperature of about 1,050° C. to about 1,250° C. during the carbonization process.

3. The method of claim 1, wherein the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof.

4. The method of claim 1, wherein the liquid refinery hydrocarbon product has a boiling point of about 260° C. to about 704° C., an average molecular weight of about 100 to about 400, and an average number of aromatic rings of 2 to about 10.

5. The method of claim 1, wherein the first functionalization process comprises an air oxidation process, an acid treatment process, a sulfurization process, a peroxide oxidation process, an organic compound oxidation process, a crosslinking process, or any combination thereof.

6. The method of claim 1, wherein the first functionalization agent is selected from oxygen gas ($O_2$), air, oxygen-enriched air, sulfuric acid, nitric acid, hydrogen peroxide, or any combination thereof.

7. The method of claim 1, wherein the first solid functionalized product comprises about 1 wt % to less than 15 wt % of oxygen.

8. The method of claim 1, wherein the first solid functionalized product has an average molecular weight of about 400 to about 1,500.

9. The method of claim 1, wherein the first solid functionalized product is ground into particles having an average particle size of less than 250 μm prior to the purification process or the second functionalization process.

10. The method of claim 1, wherein the first solid functionalized product is exposed to a solvent extraction during the purification process.

11. The method of claim 1, wherein one or more contaminants is separated from the first solid functionalized product during the purification process, and wherein the contaminant comprises an aromatic or polyaromatic compound with one or more long side chains, a paraffinic compound, or a combination thereof.

12. The method of claim 1, wherein the second functionalization process comprises an air oxidation process, an acid treatment process, a sulfurization process, a peroxide oxidation process, an organic compound oxidation process, a crosslinking process, or any combination thereof.

13. The method of claim 1, wherein the second functionalization agent is selected from oxygen gas ($O_2$), air, oxygen-enriched air, sulfuric acid, nitric acid, hydrogen peroxide, or combinations thereof.

14. The method of claim 1, wherein the second solid functionalized product comprises 15 wt % to about 50 wt % of oxygen.

15. The method of claim 1, wherein the solid nano-ordered carbon product has interspacing of about 3.4 Å to about 3.9 Å.

16. A method for preparing a nano-ordered carbon, comprising:
exposing a liquid refinery hydrocarbon product to a first oxidizing agent to produce a first solid functionalized product during a first oxidation process, wherein the first solid functionalized product comprises about 1 wt % to less than 15 wt % of oxygen;
purifying the first solid functionalized product during a purification process;
exposing the first solid functionalized product to a second oxidizing agent to produce a second solid functionalized product during a second oxidation process, wherein the second solid functionalized product comprises 15 wt % to about 50 wt % of oxygen; and
carbonizing the second solid functionalized product at a temperature of about 1,000° C. to about 1,400° C. to produce a solid nano-ordered carbon product during a carbonization process.

17. The method of claim 16, wherein the second solid functionalized product is heated to a temperature of about 1,050° C. to about 1,250° C. during the carbonization process.

18. The method of claim 16, wherein the solid nano-ordered carbon product has interspacing of about 3.4 Å to about 3.9 Å.

19. The method of claim 16, wherein a contaminant is separated from the first solid functionalized product during the purification process, and wherein the contaminant comprises an aromatic or polyaromatic compound with one or more long side chains, a paraffinic compound, or a combination thereof.

20. A method for preparing a nano-ordered carbon, comprising:
exposing a liquid refinery hydrocarbon product to a first oxidizing agent to produce a first solid functionalized product during a first oxidation process, wherein the liquid refinery hydrocarbon product has a boiling point of about 260° C. to about 704° C., an average molecular weight of about 100 to about 400, and an average number of aromatic rings of 2 to about 10, and wherein the first solid functionalized product comprises about 1 wt % to less than 15 wt % of oxygen and has an average molecular weight of about 400 to about 1,500;
purifying the first solid functionalized product during a purification process;
exposing the first solid functionalized product to a second oxidizing agent to produce a second solid functionalized product during a second oxidation process, wherein the second solid functionalized product comprises 15 wt % to about 30 wt % of oxygen; and
carbonizing the second solid functionalized product at a temperature of about 1,050° C. to about 1,250° C. to produce a solid nano-ordered carbon product during a carbonization process.

* * * * *